(12) United States Patent
Gunda et al.

(10) Patent No.: US 11,803,553 B2
(45) Date of Patent: *Oct. 31, 2023

(54) PROVIDING TRIGGERS BASED ON ONE-TO-MANY OR MANY-TO-ONE RELATIONSHIPS IN A SYSTEM OF RECORD

(71) Applicant: People Center, Inc., San Francisco, CA (US)

(72) Inventors: Siddhartha Gunda, Milpitas, CA (US); Kyle Michael Boston, San Carlos, CA (US); Daniel Robert Buscaglia, San Francisco, CA (US); Dilanka Theshan Dharmasena, Silver Spring, MD (US); Chewei Hu, Mill Valley, CA (US); Sanket Ketkar, Karnataka (IN); Ankit Raj, Karnataka (IN)

(73) Assignee: PEOPLE CENTER, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/887,944

(22) Filed: Aug. 15, 2022

(65) Prior Publication Data

US 2023/0244671 A1    Aug. 3, 2023

Related U.S. Application Data

(63) Continuation of application No. 17/587,672, filed on Jan. 28, 2022, now Pat. No. 11,416,494.

(51) Int. Cl.
*G06F 16/24* (2019.01)
*G06F 16/2455* (2019.01)

(52) U.S. Cl.
CPC .. *G06F 16/24565* (2019.01); *G06F 16/24553* (2019.01)

(58) Field of Classification Search
CPC ............... G06F 16/24565; G06F 16/24553
See application file for complete search history.

(56) References Cited

U.S. PATENT DOCUMENTS

| | | | |
|---|---|---|---|
| 7,137,100 B2 | 11/2006 | Iborra et al. | |
| 8,346,563 B1 | 1/2013 | Hjelm et al. | |
| 2016/0019215 A1* | 1/2016 | Murphey | G06F 16/24565 707/723 |
| 2018/0039952 A1* | 2/2018 | Dintenfass | G06F 16/24565 |

* cited by examiner

*Primary Examiner* — Loc Tran
(74) *Attorney, Agent, or Firm* — Dority & Manning, P.A.

(57) ABSTRACT

Systems, computer-implemented methods, applications, and user interfaces for providing triggers in a system of record are disclosed. For example, a computer-implemented method may include: maintaining a trigger where the trigger comprises condition(s), operation(s), and/or a one-to-many operator associating a first data object with multiple second data objects in organizational data associated with an organization, where the trigger can be defined based on the one-to-many operator, and where the operation(s) and/or the one-to-many operator are based on a custom computer language; evaluating the condition(s) associated with the trigger based on an occurrence of an event associated with the first data object and/or one or more of the multiple second data objects; determining that the condition(s) associated with the trigger are satisfied causing the activation of the trigger; and/or executing the operation(s) associated with the custom computer language based on the activation of the trigger.

18 Claims, 17 Drawing Sheets

Create new alert

An alert is an automated workflow you can create to indicate when this happens then do that action. Each alert consists of a trigger event and one or more alert actions. You can also add optional filter conditions. After an alert is created, it will perform the action every time the conditions are met.

○ Add a condition
When this happens...

A trigger defines a condition or event that should initiate an alert. For example: when (this date) is tomorrow or when (this field) is changed.

○ Set alert action
... then take this action.

Finally, set the action that should automatically be taken when the trigger event occurs and the conditions are met. For example, the alert could send an email notification or create a task.

FIG. 6

PROVIDING TRIGGERS BASED ON ONE-TO-MANY OR MANY-TO-ONE RELATIONSHIPS IN A SYSTEM OF RECORD

PRIORITY CLAIM

The present application is a continuation of U.S. application Ser. No. 17/587,672 having a filing date of Jan. 28, 2022, entitled "Providing Triggers Based on One-To-Many or Many-To-One Relationships in a System of Record." Applicant claims priority to and the benefit of U.S. application Ser. No. 17/587,672, which is incorporated herein by reference in its entirety.

FIELD

The present disclosure generally relates to computer systems. More particularly, the present disclosure relates to providing trigger objects, trigger operations, and user interfaces for configuring trigger objects and operations based on one-to-many and/or many-to-one relationships using computer source code or other instructions for execution by computer applications, computer systems, or internet services.

BACKGROUND

Computer programs generally refer to any collection of instructions that can be executed by a computer device to perform one or more various tasks. Computer programs usually are written in a standardized computer programming language by a computer programmer. Computer programmers are humans with specialized knowledge of one or more standardized computer programming languages. Computer programmers generally create computer programs based on writing instructions in one or more of the standardized programming languages.

In computer programming, an event generally refers to an action that is detected and processed by a computer program. For example, an event may occur based on user interaction with a user interface of a computer program. An event also may occur within a program itself or based on some type of communication or interaction involving another computer program. A computer program generally may perform one or more operations after detecting an event.

A database application or "database" generally refers to a type of computer program that primarily stores and retrieves data. A database generally may execute procedural instructions from a database trigger in response to a certain event involving a particular table or view within the database. However, database triggers generally are limited to operations performed on objects within a database. As such, database triggers are unable to support various types of operations associated with maintaining an enterprise system of record integrated with multiple, different third-party systems and applications. Therefore, a need exists for providing triggers that support operations associated with enterprise systems of record.

SUMMARY

Aspects and advantages of embodiments of the present disclosure will be set forth in part in the following description, or can be learned from the description, or can be learned through practice of the embodiments.

An example embodiment of the present disclosure is directed to a computer system that can implement an organizational management platform for an organization. The computer system can include one or more processors. The computer system can further include one or more databases that can collectively store organizational data associated with the organization. The organizational data can include an object graph data structure that can include a plurality of data objects that can respectively correspond to a plurality of entities of the organization. The computer system can further include one or more non-transitory computer-readable media that can collectively store instructions that, when executed by the one or more processors, can cause the computer system to perform operations. The operations can include maintaining a trigger. The trigger can include one or more conditions for activation of the trigger. The trigger can further include one or more operations for execution based on the activation of the trigger. The one or more operations can be based on a custom computer language. The trigger can further include a one-to-many operator that can associate a first data object of the plurality of data objects with multiple second data objects of the plurality of data objects. The one-to-many operator can be based on the custom computer language. The trigger can be defined based at least in part on the one-to-many operator. The operations can further include evaluating the one or more conditions based on an occurrence of an event associated with at least one of the first data object, one or more of the multiple second data objects, or one or more entities of the plurality of entities. The operations can further include determining that the one or more conditions are satisfied based on the evaluating. The determining causing the activation of the trigger. The operations can further include executing the one or more operations based on the activation of the trigger. The one or more operations can be performed based at least in part on the organizational data.

Another example embodiment of the present disclosure is directed to a computer-implemented method for performing processing of computer instructions. The computer-implemented method can include maintaining, by one or more processors, a trigger. The trigger can include one or more conditions for activation of the trigger. The trigger can further include one or more operations for execution based on the activation of the trigger. The one or more operations can be based on a custom computer language. The trigger can further include a one-to-many operator that can associate a first data object of an object graph data structure with multiple second data objects of the object graph data structure. The one-to-many operator can be based on the custom computer language. The trigger can be defined based at least in part on the one-to-many operator. The computer-implemented method can further include evaluating, by the one or more processors, the one or more conditions based on an occurrence of an event associated with at least one of the first data object, one or more of the multiple second data objects, a first entity corresponding to the first data object, or one or more second entities respectively corresponding to the multiple second data objects. The computer-implemented method can further include determining, by the one or more processors, that the one or more conditions are satisfied based on the evaluating. The determining can cause the activation of the trigger. The computer-implemented method can further include executing, by the one or more processors, the one or more operations based on the activation of the trigger. The one or more operations can be performed based at least in part on organizational data associated with an organization.

Another example embodiment of the present disclosure is directed to a computer system that can implement an organizational management platform for an organization. The computer system can include one or more processors. The computer system can further include one or more databases that can collectively store organizational data associated with the organization. The organizational data can include an object graph data structure that can include a plurality of data objects that can respectively correspond to a plurality of entities of the organization. The computer system can further include one or more non-transitory computer-readable media that can collectively store instructions that, when executed by the one or more processors, can cause the computer system to perform operations. The operations can include maintaining a trigger. The trigger can include one or more conditions for activation of the trigger. The trigger can further include one or more operations for execution based on the activation of the trigger. The one or more operations can be based on a custom computer language. The trigger can further include a many-to-one operator that can associate multiple first data objects of the plurality of data objects with a second data object of the plurality of data objects. The many-to-one operator can be based on the custom computer language. The trigger can be defined based at least in part on the many-to-one operator. The operations can further include evaluating the one or more conditions based on an occurrence of an event associated with at least one of one or more of the multiple first data objects, the second data object, or one or more entities of the plurality of entities. The operations can further include determining that the one or more conditions are satisfied based on the evaluating. The determining causing the activation of the trigger. The operations can further include executing the one or more operations based on the activation of the trigger. The one or more operations can be performed based at least in part on the organizational data.

Other aspects of the present disclosure are directed to various systems, apparatuses, non-transitory computer-readable media, user interfaces, and devices for providing triggers based on one-to-many and/or many-to-one relationships in a system of record. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts an illustration of an example user interface for configuring a trigger based on one-to-many or many-to-one relationships between different entities and/or data objects in a system of record, according to example embodiments of the present disclosure.

Figure 1:
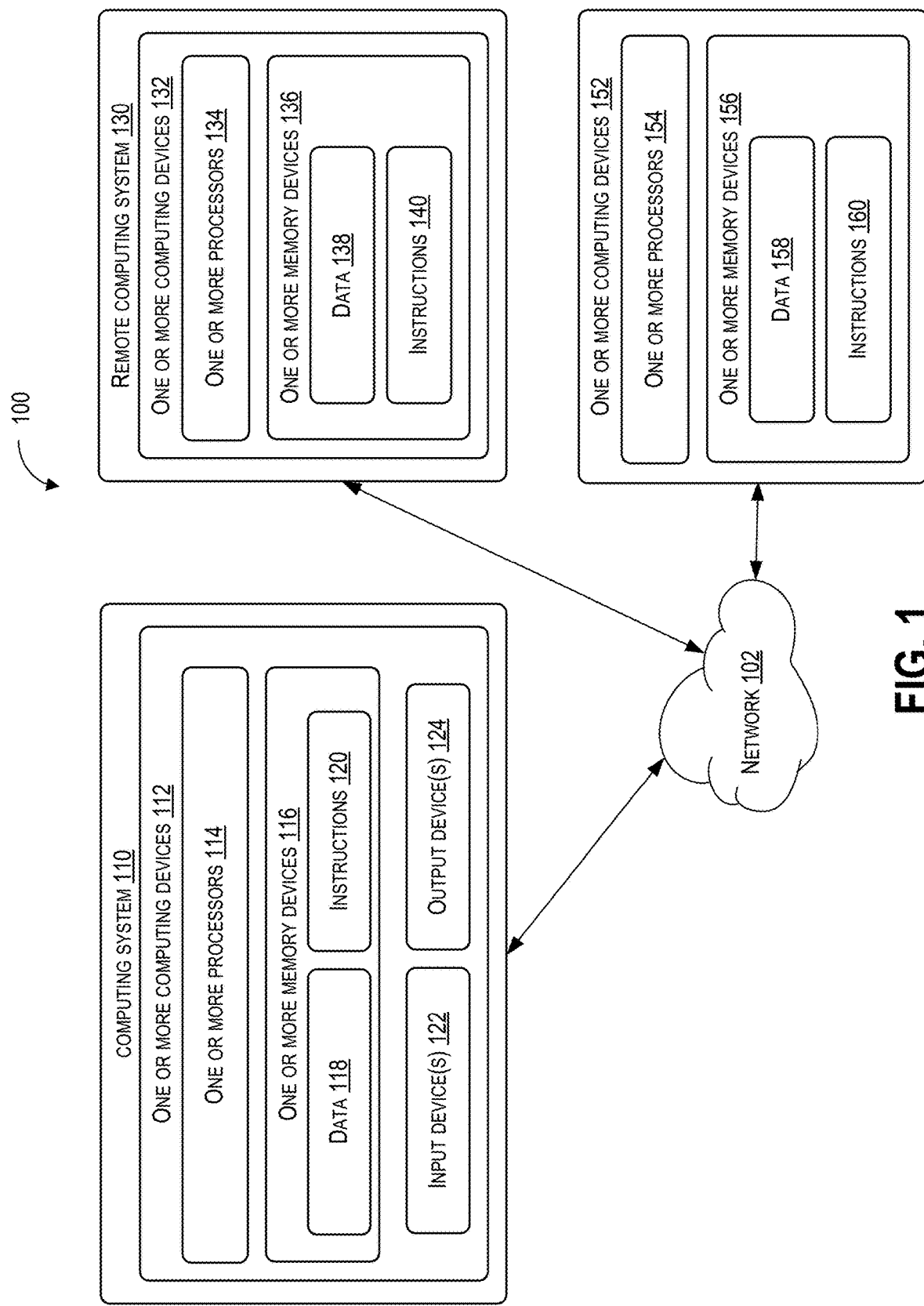
FIG. 1 depicts a block diagram of an example environment including a computing system that performs operations, according to example embodiments of the present disclosure.

Reference numerals that are repeated across plural figures are intended to identify the same features in various implementations.

DETAILED DESCRIPTION

Generally, the present disclosure is directed to improved computer systems, computer applications, computer-implemented methods, user interfaces, and/or services for providing triggers based on one-to-many and/or many-to-one relationships in a system of record that manages organizational data and associated operations performed based on the organizational data across separate third-party applications. In particular, examples described in the present disclosure enable configuration, testing, approval, and automation of advanced triggering based on one-to-many and/or many-to-one relationships in a system of record using a custom computer language for managing organizational data. As one example, a user may configure one or more triggers for use in an organizational data management system using one or more specialized user interfaces, where such one or more triggers can be based on one-to-many and/or many-to-one relationships between different entities and/or data objects associated with the organizational data. Such specialized user interfaces generally may allow the user to configure one or more conditions and operations of respective triggers based on categories of entities associated with the organizational data management system, including entities associated with third-party applications that are integrated with the organizational data management system. In one example, the specialized user interfaces can allow the user to configure one or more conditions and one or more operations of a trigger using a one-to-many operator that can define the trigger based on a one-to-many relationship between a first entity and/or data object and multiple second entities and/or data objects of the organizational data. In another example, the specialized user interfaces can allow the user to configure one or more conditions and one or more operations of a trigger using a many-to-one operator that can define the trigger based on a many-to-one relationship between multiple first entities and/or data objects and a second entity and/or data object of the organizational data. The organizational data management system then may use the configuration information provided by a user for respective triggers to generate instructions in a custom computer language, where such a one-to-many and/or many-to-one operator can be based on and/or supported by such a custom computer language. The organizational data management system then can use the generated instructions in the custom computer language to test and/or implement such triggers. The organizational data management system may run various diagnostic testing of triggers being configured by the user and report results of such testing to the user. The organizational data management system also may determine and implement special approval prior to deployment of respective triggers, for example, based on data, operations, and/or diagnostic testing information associated with respective triggers.

Organizations generally use many different types of applications and computer systems to sustain operations. Such applications and computer systems generally rely on organizational data and processing tied to organizational data. Usually, organizational data is generated, modified, and utilized separately across various different types of third-party applications and computer systems. For example, various different third-party applications and computer systems may generate and/or store portions of organizational data, may perform operations based on organizational data, may provide applications and related services to users based on organizational data, etc. However, this leaves organizations responsible for ensuring that their own organizational data is updated consistently and regularly across a variety of different applications and computer systems. In many cases, organizational data and associated processes become out of sync when not updated consistently. As such, organizations generally are left to performing continuous manual processing of organizational data, coordinating and ensuring compatibility between changing configurations across each of multiple different third-party applications and computer systems, and/or building their own expensive, proprietary integrations across various third-party applications and computer systems that must be maintained and updated (e.g., when organizational procedures change, based on organizational data management changes, when vendors update their own proprietary third-party applications, etc.). As such, organizations can benefit from improved computer systems, computer applications, computer-implemented methods, user interfaces, and related services for providing triggers based on one-to-many and/or many-to-one relationships in a system of record that manages organizational data and associated operations performed based on the organizational data across separate third-party applications.

The present disclosure describes examples for providing one or more triggers in a system of record that manages organizational data and associated operations across various third-party applications, where such one or more triggers can respectively be based on one-to-many and/or many-to-one relationships between different entities and/or data objects associated with the organizational data. In examples of the present disclosure, a computer system (e.g., computing system 110, computing system 310, etc.) may implement such one or more triggers based on, for example: maintaining a trigger associated with an application where the trigger can include one or more conditions for activation of the trigger, one or more operations for execution based on the activation of the trigger (e.g., one or more tasks, functions, workflows, etc.), and/or a one-to-many operator that associates a first entity and/or data object with multiple second entities and/or data objects of the organizational data where the trigger can be defined based at least in part on the one-to-many operator and where the one or more operations and/or the one-to-many operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

In other examples of the present disclosure, the computer system may implement such one or more triggers based on, for example: maintaining a trigger associated with an application where the trigger can include one or more conditions for activation of the trigger, one or more operations for execution based on the activation of the trigger (e.g., one or more tasks, functions, workflows, etc.), and/or a many-to-one operator that associates multiple first entities and/or data objects with a second entity and/or data object of the organizational data where the trigger can be defined based at least in part on the many-to-one operator and where the one or more operations and/or the many-to-one operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

Example implementations of the present disclosure can be implemented in the context of or as a portion of an organizational data management platform that controls and leverages organizational data to manage organizational applications such as payroll, operations, human resources (e.g., onboarding and offboarding), benefits, information technology and device management, third-party application integration and access, and many others.

The organizational data management platform can hold, for each of one or more organizations, a centralized set of organizational data that acts as a single, centralized system of record for all organizational management processes for that organization. Each organization can include a number of users which are able to access and interact with the organizational data management platform. Some users may have administrative permissions which define whether the user is able to access and/or modify certain types of organizational data for their organization.

The organizational data for each organization can include data directly entered into the organizational data management platform and/or can include data retrieved, pulled, or otherwise obtained from one or more first party and/or third-party applications with which the organizational data management platform may have varying levels of integration. This ingestion and storage of data from third-party applications is in contrast to systems which simply sit on top of third-party applications and apply rules at run time. In some implementations, the organizational data management platform can provide a user with the ability (e.g., by configuring Simple Mail Transfer Protocol (SMTP) settings) to configure the cadence or periodicity at which the organizational data management platform receives or ingests data (e.g., via .csv files) from third-party applications. Data can be transferred between the organizational data management platform and third-party applications (e.g., to and/or from) using various techniques such as application programming interfaces, data hooks, flat files, bulk uploads/downloads and/or other data transfer mechanisms.

The organizational data can, in some implementations, be held as one or more object databases (e.g., in the form of one or more object graph data structures). For example, multiple object classes can be defined in the object databases. Example object classes include employees, devices, job candidates, benefits policies, documents, pay instances, timecards, and/or other objects. For each object, values can be provided and maintained for one or more attributes, such as location, role, salary, etc. Links can be made between different objects. For example, one or more device objects can be associated with employee objects.

The object database(s) can be represented as or can store data which can be represented as one or more graphs with nodes that correspond to objects (e.g., data objects) and edges that correspond to links or logical associations between objects and/or object attribute(s). Graph(s) can be traversed to understand or leverage relationships among objects (e.g., data objects) and their attribute(s). In one example, the organizational data can be synthesized into a single graph which includes multiple classes of objects and defines complex relationships among objects and their attribute(s). For example, all workflows, including payroll, IT, etc. can be run through one platform and graph. In some implementations, the employee objects can be referred to and/or treated as sentinel nodes.

In some implementations, the organizational data can include organizational structure data. For example, the organizational structure data can be encoded within links or edges defined between objects (e.g., data objects) of the organizational data or can be stored as a separate data layer. For example, the organizational structure data can define organizational relationships between objects, including employee objects. As one example, the organizational structure data may indicate that a first employee object has the relationship of "manager" relative to a second employee object. The organizational relationships can be defined between specific objects and/or groups of objects. As another example, the organizational structure data may indicate that a first group of employees (e.g., the "IT Administrator" group of employees) has a certain set of permissions (e.g., device activation/deactivation) relative to a particular group of devices (e.g., the "work laptops" group of the devices).

Example implementations of the present disclosure can leverage a domain-specific query language that can be used to perform (e.g., in real time) queries against the organizational data. The custom query language can be used to define functions (e.g., operators) or queries which return data that satisfies or responds to the functions or queries. In some implementations, the custom query language is a declarative language. In some implementations, the custom query language includes organization functions or operators which leverage organizational relationships within the organizational data. For example, the organization function ORG (employee, relationship) returns one or more other employees that have the specified relationship to the specified employee.

In at least one embodiment, the above-described custom query language (also referred to herein as a "custom computer language") can define, include, and/or implement a one-to-many operator or function that can leverage organizational relationships within the organizational data to associate a first entity and/or data object with multiple second entities and/or data objects of the organizational data. In another example embodiment, the custom query language can define, include, and/or implement a many-to-one operator or function that can leverage organizational relationships within the organizational data to associate multiple first entities and/or data objects with a second entity and/or data object of the organizational data. In some embodiments, the above-described one-to-many operator and/or many-to-one operator can include, but is not limited to, for instance: an "ANY" operator (e.g., "any {model2_name} for the {model1_name}"); an "EXTRACT" operator (e.g., "extract a specific {model2_name} for the {model1_name}"); an "AGGREGATE" operator (e.g., "aggregate across the {model1_name}'s {model2_name}"); a "COUNT" operator (e.g., "count the {model1_name}'s {model2_name}"); a "MOST RECENTLY USED" operator; a "MOST RECENTLY ASSIGNED" operator; and/or another operator.

According to an aspect of the present disclosure, the custom query language can be incorporated into reports, policies, triggering, data management, and/or workflows. For example, a user-constructed query in the custom query language can be used for intelligently facilitating various downstream operations, for example, by reference/query to an employee or organizational chart.

In one example, the custom query language can allow for the creation of "calculated fields" which can be data fields which are or act as a function of a custom query language script and can be propagated to or referenced by other reports, policies, triggering, data management, and/or workflows.

In other examples, custom query language expressions can underlie or be included in predefined reports, policies, triggering, data management, and/or workflows. These predefined items can be visible and modifiable by the user (e.g., in raw query expression form or via a wizard user interface). For example, in a wizard user interface, objects or functions can be automatically populated and/or suggested.

In some implementations, the custom query language can handle or include functions or expressions which include "organization" functions or operators which leverage employee or organizational data held by the core system of record. For example, as described elsewhere herein, the function ORG(employee, relationship) can return one or more other employees that have the relationship to the employee given in the function. Other example organization functions or operators may return employees or other data based on any of the employee or organizational data held by the core system of record (e.g., return all employees working in California making over $100,000/year).

In an example embodiment, the above-described "ANY" operator can include and/or constitute an "any {model2_name} for the {model1_name}" operator and/or function. For example, the "ANY" operator can include and/or constitute an operator (e.g., a function and/or statement written in a custom computer language) that allows multiple first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "ANY" operator can return "any device for the employee" such that a user can view all {model2_name} fields (e.g., device fields) associated with {model1_name} (e.g., the employee) in a subsequent panel of a user interface (e.g., a graphical user interface). In this example, the user can configure (e.g., define) a trigger in accordance with one or more embodiments described herein based on the above-described "ANY" operator. For instance, the "ANY" operator can allow for the user to configure (e.g., define) a trigger such that at least one condition for activation of the trigger is based on any device (e.g., all devices) assigned to an employee of an organization.

In an example embodiment, the above-described "EXTRACT" operator can include and/or constitute an "extract a specific {model2_name} for the {model1_name}" operator and/or function. For example, the "EXTRACT" operator can include and/or constitute an operator (e.g., a function and/or statement written in a custom computer language) that allows at least one of multiple first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "EXTRACT" operator can "extract a specific device for the employee" such that a user can view all selectable {model2_name} fields (e.g., selectable device fields) associated with {model1_name} (e.g., the employee) in a subsequent panel and/or a dropdown menu of a user interface (e.g., a graphical user interface) and select one or more. In this example, the user can configure (e.g., define) a trigger in accordance with one or more embodiments described herein based on the above-described "EXTRACT" operator. For instance, the "EXTRACT" operator can allow for the user to configure (e.g., define) a trigger such that at least one condition for activation of the trigger is based on one or more certain devices assigned to an employee of an organization. In another example, the "EXTRACT" operator can allow for the user to configure (e.g., define) a trigger such that at least one condition for activation of the trigger is based on one or more attributes of such one or more certain devices assigned to an employee of an organization.

In an example embodiment, the above-described "AGGREGATE" operator can include and/or constitute an "aggregate across the {model1_name}'s {model2_name}" operator and/or function. For example, the "AGGREGATE" operator can include and/or constitute an operator (e.g., a function and/or statement written in a custom computer language) that allows aggregated values of at least one attribute corresponding to each of a plurality of first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "AGGREGATE" operator can "aggregate across the employee's devices" such that a user can view all fields for {model2_name} that can be aggregated (e.g., all device fields that can be aggregated) in a subsequent panel of a user interface (e.g., a graphical user interface). In this example, the user can configure (e.g., define) a trigger in accordance with one or more embodiments described herein based on the above-described "AGGREGATE" operator. For instance, the "AGGREGATE" operator can allow for the user to configure (e.g., define) a trigger such that at least one condition for activation of the trigger is based on aggregated values of at least one attribute corresponding to each device assigned to an employee of an organization.

In an example embodiment, the above-described "COUNT" operator can include and/or constitute an "count the {model1_name}'s {model2_name}" operator and/or function. For example, the "COUNT" operator can include and/or constitute an operator (e.g., a function and/or statement written in a custom computer language) that allows a total number of first entity and/or data object instances in a plurality of first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "COUNT" operator can "count the employee's devices" such that a user can view the count of instances of {model2_name} (e.g., the number of devices) associated with {model1_name} (e.g., the employee). In this example, the user can configure a trigger in accordance with one or more embodiments described herein based on the above-described "COUNT" operator. For instance, the "COUNT" operator can allow for the user to configure (e.g., define) a trigger such that at least one condition for activation of the trigger is based on a total number of devices assigned to an employee of an organization.

The systems, methods, and computer program products described herein provide a number of technical effects and benefits. As one example, the embodiments described in the present disclosure provide configurable application triggers based on one-to-many and/or many-to-one relationships for a system of record that provide automated evaluation of conditions and automated execution of operations within the system of record and any number of separate third-party applications that utilize different underlying technologies and technical designs, for example, more efficiently and with fewer computing resources (e.g., less processing power, less memory usage, less power consumption, etc.), than would otherwise be wasted by maintaining custom, proprietary, and/or manual synchronization processes. In particular, examples of the present disclosure provide automation of trigger operations based on one-to-many and/or many-to-one relationships in a system of record and across different applications and systems using a rigorous computerized process.

With reference to the Figures, example embodiments of the present disclosure will be discussed in further detail.

FIG. 1 depicts a block diagram of an example environment 100 including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, HTTP, SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, one or more computing devices 152, etc.) via the network 102. The computing system 110 may operate in various different configurations including as a server or a client machine in a client-server network environment, or as a peer machine in a peer-to-peer (or distributed) network environment. Though the computing system 110 is depicted in FIG. 1 as a single device, the computing system 110 can include any collection or combination of devices that individually or in combination with other devices, execute a set of one or more instructions to perform any one or more of the operations discussed herein.

In this example, the computing system 110 includes the one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an ASIC, a FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein including, for example, one or more operations associated with providing triggers based on one-to-many and/or many-to-one relationships for a system of record in association with a custom query language (e.g., the above-described custom query language for use with organizational data) across various types of applications and/or computer systems. Further, the one or more memory devices 116 can store the data 118 and/or the instructions 120, which can be executed by the one or more processors 114 to cause the one or more computing devices 112 to perform one or more operations.

In one example embodiment, the one or more operations that can be performed by the one or more processors 114 can include, but are not limited to: maintaining a trigger associated with an application where the trigger can include one or more conditions for activation of the trigger, one or more operations for execution based on the activation of the trigger (e.g., one or more tasks, functions, workflows, etc.), and/or a one-to-many operator that associates a first entity and/or data object with multiple second entities and/or data objects of the organizational data where the trigger can be defined based at least in part on the one-to-many operator and where the one or more operations and/or the one-to-many operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

In another example embodiment, the one or more operations that can be performed by the one or more processors 114 can include, but are not limited to: maintaining a trigger associated with an application where the trigger can include one or more conditions for activation of the trigger, one or more operations for execution based on the activation of the trigger (e.g., one or more tasks, functions, workflows, etc.), and/or a many-to-one operator that associates multiple first entities and/or data objects with a second entity and/or data object of the organizational data where the trigger can be defined based at least in part on the many-to-one operator and where the one or more operations and/or the many-to-one operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

In some embodiments, the above-described one-to-many operator and/or many-to-one operator can include, but is not limited to, for instance: an "ANY" operator (e.g., "any {model2_name} for the {model1_name}"); an "EXTRACT" operator (e.g., "extract a specific {model2_name} for the {model1_name}"); an "AGGREGATE" operator (e.g., "aggregate across the {model1_name}'s {model2_name}"); a "COUNT" operator (e.g., "count the {model1_name}'s {model2_name}"); a "MOST RECENTLY USED" operator; a "MOST RECENTLY ASSIGNED" operator; and/or another operator.

In an example embodiment, the above-described "ANY" operator can include and/or constitute an "any {model2_name} for the {model1_name}" operator and/or function. For example, the "ANY" operator can include and/or constitute an operator (e.g., a function and/or statement written in a custom computer language) that allows multiple first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "ANY" operator can return "any device for the employee" such that a user can view all {model2_name} fields (e.g., device fields) associated with {model1_name} (e.g., the employee) in a subsequent panel of a user interface (e.g., a graphical user interface). In this example, the user can configure (e.g., define) a trigger in accordance with one or more embodiments described herein based on the above-described "ANY" operator. For instance, the "ANY" operator can allow for the user to configure (e.g., define) a trigger such that at least one condition for activation of the trigger is based on any device (e.g., all devices) assigned to an employee of an organization.

In an example embodiment, the above-described "EXTRACT" operator can include and/or constitute an "extract a specific {model2_name} for the {model1_name}" operator and/or function. For example, the "EXTRACT" operator can include and/or constitute an operator (e.g., a function and/or statement written in a custom computer language) that allows at least one of multiple first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "EXTRACT" operator can "extract a specific device for the employee" such that a user can view all selectable {model2_name} fields (e.g., selectable device fields) associated with {model1_name} (e.g., the employee) in a subsequent panel and/or a dropdown menu of a user interface (e.g., a graphical user interface) and select one or more. In this example, the user can configure (e.g., define) a trigger in accordance with one or more embodiments described herein based on the above-described "EXTRACT" operator. For instance, the "EXTRACT" operator can allow for the user to configure (e.g., define) a trigger such that at least one condition for activation of the trigger is based on one or more certain devices assigned to an employee of an organization. In another example, the "EXTRACT" operator can allow for the user to configure (e.g., define) a trigger such that at least one condition for activation of the trigger is based on one or more attributes of such one or more certain devices assigned to an employee of an organization.

In an example embodiment, the above-described "AGGREGATE" operator can include and/or constitute an "aggregate across the {model1_name}'s {model2_name}" operator and/or function. For example, the "AGGREGATE" operator can include and/or constitute an operator (e.g., a function and/or statement written in a custom computer language) that allows aggregated values of at least one attribute corresponding to each of a plurality of first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "AGGREGATE" operator can "aggregate across the employee's devices" such that a user can view all fields for {model2_name} that can be aggregated (e.g., all device fields that can be aggregated) in a subsequent panel of a user interface (e.g., a graphical user interface). In this example, the user can configure (e.g., define) a trigger in accordance with one or more embodiments described herein based on the above-described "AGGREGATE" operator. For instance, the "AGGREGATE" operator can allow for the user to configure (e.g., define) a trigger such that at least one condition for activation of the trigger is based on aggregated values of at least one attribute corresponding to each device assigned to an employee of an organization.

In an example embodiment, the above-described "COUNT" operator can include and/or constitute an "count the {model1_name}'s {model2_name}" operator and/or function. For example, the "COUNT" operator can include and/or constitute an operator (e.g., a function and/or statement written in a custom computer language) that allows a total number of first entity and/or data object instances in a plurality of first entities and/or data objects in an object graph data structure to be used to define one or more conditions for activation of a trigger with respect to (e.g., in association with) a second entity and/or data object in the object graph data structure. For instance, in an embodiment where {model2_name} corresponds to a "device" and {model1_name} corresponds to an "employee," the "COUNT" operator can "count the employee's devices" such that a user can view the count of instances of {model2_name} (e.g., the number of devices) associated with {model1_name} (e.g., the employee). In this example, the user can configure a trigger in accordance with one or more embodiments described herein based on the above-described "COUNT" operator. For instance, the "COUNT" operator can allow for the user to configure (e.g., define) a trigger such that at least one condition for activation of the trigger is based on a total number of devices assigned to an employee of an organization.

The data 118 can include organizational data (e.g., organizational data that can include one or more organizational records), one or more data structures defining, describing, and/or otherwise associated with the organizational data, rule data (e.g., rule data that includes one or more rules used to configure an application policy, one or more rules maintained by or otherwise associated with an organizational data management system, etc.), application data (e.g., application data associated with a plurality of applications including one or more third-party applications and/or one or more intra-organizational applications), third-party integration data (e.g., data providing configuration and/or other information for performing integration and synchronization with each of one or more different third-party systems and/or applications), organizational policy data (e.g., organizational policy data associated with one or more organizational policies), application policy data (e.g., policy data that includes one or policies associated with the organizational data, the rule data, the application data, one or more applications, one or more devices, etc.), data that includes instructions in a custom computer language (e.g., the above-described custom query language based on organizational data), data that includes rules associated with the custom computer language, and/or other types of data. Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or the one or more applications can be associated with an organization. Further, the computing system 110 may be associated with an organization and may be configured to manage the one or more applications. For example, the computing system 110 can perform one or more operations associated with authenticating one or more users that attempt to access the one or more applications which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices, (e.g., mouse device), one or more buttons, one or more microphones, and/or one or more cameras. The one or more output devices 124 can include one or more display devices, one or more loudspeaker devices, one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing triggers based on one-to-many and/or many-to-one relationships between entities and/or data objects in a system of record) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, application object data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions) that can be stored and/or executed by such one or more computing devices 152. Further, the one or more applications can include one or more third-party applications that may be accessed from the one or more computing devices 152 and which are at least partly operated from such one or more computing devices 152. Data 138 may include, for example, one or more portions of the organizational data (e.g., one or more organizational records), one or more data structures associated with the organizational data, rule data, organizational policy data, application policy data, third-party integration data (e.g., third-party application integration data), application object data, and/or other types of data.

Figure 2:
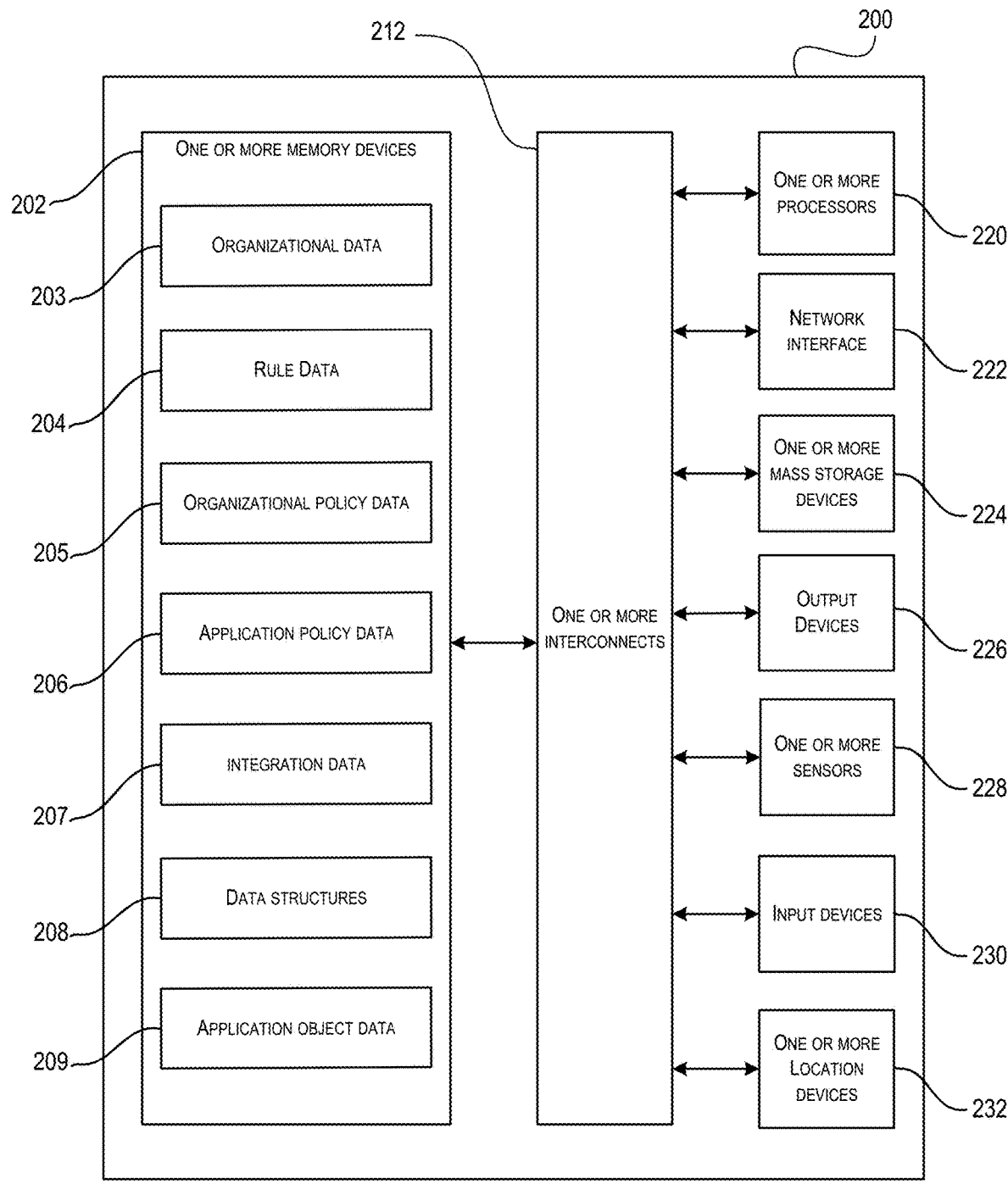
FIG. 2 depicts a block diagram of an example of a computing device, according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, application policy data 206, integration data 207, data structures 208, application object data 209, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, application policy data 206, integration data 207, data structures 208, application object data 209, and/or any other types of data). Further, the one or more memory devices 202 can include one or more non-transitory computer-readable storage media, including RAM, ROM, EEPROM, EPROM, flash memory devices, magnetic disks, and any combination thereof.

In one example embodiment, the information and/or data that can be stored by the one or more memory devices 202 can be executed by the one or more processors 220 to cause the computing device 200 to perform one or more operations associated with providing triggers based on one-to-many and/or many-to-one relationships between entities and/or data objects in a system of record (e.g., based on computer instructions in a custom computer language provided by the system of record, such as the above-described custom query language) across various types of applications and/or computer systems, including, for example: maintaining a trigger associated with an application where the trigger can include one or more conditions for activation of the trigger, one or more operations for execution based on the activation of the trigger (e.g., one or more tasks, functions, workflows, etc.), and/or a one-to-many operator that associates a first entity and/or data object with multiple second entities and/or data objects of the organizational data where the trigger can be defined based at least in part on the one-to-many operator and where the one or more operations and/or the one-to-many operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

In some embodiments, the above-described one-to-many operator and/or many-to-one operator can include, but is not limited to, for instance: an "ANY" operator (e.g., "any {model2_name} for the {model1_name}"); an "EXTRACT" operator (e.g., "extract a specific {model2_name} for the {model1_name}"); an "AGGREGATE" operator (e.g., "aggregate across the {model1_name}'s {model2_name}"); a "COUNT" operator (e.g., "count the {model1_name}'s {model2_name}"); a "MOST RECENTLY USED" operator; a "MOST RECENTLY ASSIGNED" operator; and/or another operator. For example, in some embodiments, the one-to-many operator and/or the many-to-one operator can include and/or constitute any of the "ANY" operator, the "EXTRACT" operator, the "AGGREGATE" operator, the "COUNT" operator, the "MOST RECENTLY USED" operator, and/or the "MOST RECENTLY ASSIGNED" operator described above with reference to the example embodiment depicted in FIG. 1.

In another example embodiment, the information and/or data that can be stored by the one or more memory devices 202 can be executed by the one or more processors 220 to cause the computing device 200 to perform one or more operations associated with providing triggers based on one-to-many and/or many-to-one relationships between entities and/or data objects in a system of record (e.g., based on computer instructions in a custom computer language provided by the system of record, such as the above-described custom query language) across various types of applications and/or computer systems, including, for example: maintaining a trigger associated with an application where the trigger can include one or more conditions for activation of the trigger, one or more operations for execution based on the activation of the trigger (e.g., one or more tasks, functions, workflows, etc.), and/or a many-to-one operator that associates multiple first entities and/or data objects with a second entity and/or data object of the organizational data where the trigger can be defined based at least in part on the many-to-one operator and where the one or more operations and/or the many-to-one operator are based on a custom computer language supported by the application; evaluating the one or more conditions associated with the trigger based on an occurrence of an event associated with the application; determining that the one or more conditions associated with the trigger are satisfied causing the activation of the trigger; and/or executing the one or more operations associated with the custom computer language based on the activation of the trigger where the one or more operations are performed based at least in part on the organizational data.

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored respectively in any of the one or more memory devices 116, 136, 156. The organizational data 203 also can include information associated with one or more applications (e.g., one or more third-party applications), one or more organizational records and/or one or more organizational policies. In some embodiments, the organizational data 203 can be received from one or more computing systems (e.g., the remote computing system 130 depicted in FIG. 1) which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with one or more rules that can be used to generate and/or implement an application policy. The rule data 204 also can include information associated with one or more rules of an organizational data management system (e.g., base or default rules provided or enforced by the system, one or more custom rules configured by an organization, etc.). The rule data 204 also can include one or more rules associated with implementing and/or utilizing a custom computer language, such as a custom computer language (e.g., the above-described custom query language) for performing operations associated with organizational data 203. In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate one or more applications (e.g., one or more third-party applications), one or more computing devices, and/or one or more records which can include one or more organizational records and/or one or more employee records. In some embodiments, the organizational policy data 205 can be received from one or more computing systems (e.g., the remote computing system 130 depicted in FIG. 1) which can include one or more computing systems that are remote from the computing device 200.

The application policy data 206 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application policy data 206 can include information associated with one or more policies that are used to implement an application policy associated with one or more applications (e.g., one or more third-party applications), one or more computing devices, and/or one or more records which can include one or more organizational records and/or one or more employee records. In some embodiments, the application policy data 206 can be received from one or more computing systems (e.g., the remote computing system 130 depicted in FIG. 1) which can include one or more computing systems that are remote from the computing device 200.

The integration data 207 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The integration data 207 can include configuration and/or operational information associated with integrating and synchronizing data (e.g., organizational data 203) among one or more applications. For example, the integration data 207 can include information that enables integration and synchronization between each of one or more applications (e.g., third-party applications and/or other applications). In an embodiment, the integration data 207 provides integration information that allows an organizational data management system (e.g., a system of record for organizational data and organizational data processing), for example: to obtain information from one or more applications (e.g., third party and/or other applications); to perform operations involving organizational data (e.g., organizational data 203) in the organizational data management system; to synchronize organizational data across one or more applications; to perform one or more actions involving the applications based on organizational data in the organizational data management system; and/or to perform one or more other operations associated with managing organizational data as a system of record. In some embodiments, the integration data 207 can be received from one or more computing systems (e.g., the remote computing system 130 depicted in FIG. 1), which can include one or more computing systems that are remote from the computing device 200.

The data structures 208 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The data structures 208 can include one or more logical and/or physical instances of information representing or describing, for example: one or more entities (e.g., objects (e.g., data objects), records, etc.); one or more relationships involving the one or more entities (e.g., relationships between entities); one or more data values associated with each of the one or more entities and/or the one or more relationships; one or more functions and/or operations that may be applied to each of the one or more entities and/or the one or more relationships; and/or any other data or metadata describing or otherwise defining structure and/or rules associated with the one or more entities and/or the one or more relationships.

The data structures 208 can be implemented and utilized with one or more types of computer software, computer hardware, or any combination thereof. In an embodiment, the data structures 208 are used to represent and perform processing associated with various types of organizational data (e.g., organizational data 203). For example, the data structures 208 may include information about various types of information and entities associated with organizational data including, but not limited to, individuals (e.g., employees, vendors, independent contractors, etc.), departments, teams, roles, groups, locations, offices, documents, tasks, reports, accounts, devices, applications, end-user applications, licenses, workflows, alerts, and/or any other type of entity representing or related to managing organizational data (e.g., organizational data 203).

The data structures 208 also can define various relationships among the various entities associated with organizational data. For example, the data structures 208 may define and be used to enforce relationships such as, for instance: each employee must be assigned to a department; each employee can be included on one or more teams; each employee must be assigned to a primary location; each employee may be assigned to one or more secondary locations; employees may have one or more computing devices; each vendor must have a current audit; each independent contractor must be associated with a contract; and/or any other relationships provided by an organizational data management system or configured for an organization that utilizes an organizational data management system (e.g., a system for managing organizational data 203 based on one or more organizational data management applications).

In some embodiments, the data structures 208 can include one or more object graphs (e.g., based on an object graph data model) providing information about entities, relationships, and/or any other aspects relating to the definition, structure, and rules associated with organizational data (e.g., organizational data 203). The data structures 208 also can include any one or more other types of data structures (e.g., with or without the use of object graphs) that provide information about entities, entity attributes, entity attribute categories, relationships, and/or any other aspects of the definition, structure, and/or rules associated with organizational data. In some embodiments, the data structures 208 can be received from one or more computing systems (e.g., the remote computing system 130 depicted in FIG. 1), which can include one or more computing systems that are remote from the computing device 200.

The application object data 209 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the application object data 209 generally can include any information used to implement any particular type of application object or associated data structure that stores, references, utilizes, and/or processes data (e.g., organizational data 203). For example, such types of application objects generally may include, but are not limited to, application triggers, reports, workflows, tasks, custom application objects, and/or any other types of objects used to store and/or process data in a system of record, such as an organizational data management system. Further, application object data 209 that can be used to implement any particular type of application object or associated data structure may include, but is not limited to: instructions in a computer language (e.g., a custom computer language provided by an organizational data management system for managing organizational data 203); metadata associated with application objects or related data structures; data associated with one or more particular instances of application objects or related data structures; data associated with configuration of one or more application objects or related data structures; and/or other data that can be used to implement any particular type of application object or associated data structure. In some embodiments, the application object data 209 can be received from one or more computing systems (e.g., the remote computing system 130 depicted in FIG. 1) which can include one or more computing systems that are remote from the computing device 200.

The one or more interconnects 212 can include one or more interconnects or buses that can be used to send and/or receive one or more signals (e.g., electronic signals) and/or data (e.g., organizational data 203, rule data 204, organizational policy data 205, application policy data 206, integration data 207, data structures 208, application object data 209, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further, the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the organizational data 203, the rule data 204, the organizational policy data 205, the application policy data 206, the integration data 207, the data structures 208, the application object data 209, and/or any other data. The one or more processors 220 can include single or multiple core devices including a microprocessor, microcontroller, integrated circuit, and/or a logic device.

The network interface 222 can support network communications. The network interface 222 can support communication via networks including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data including the organizational data 203, the rule data 204, the organizational policy data 205, the application policy data 206, the integration data 207, the data structures 208, the application object data 209, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices.

Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more buttons (e.g., ON/OFF buttons and/or YES/NO buttons), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, the one or more memory devices 202 can be used to operate or execute a general-purpose operating system that operates on mobile computing devices and/or and stationary devices, including for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g. a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
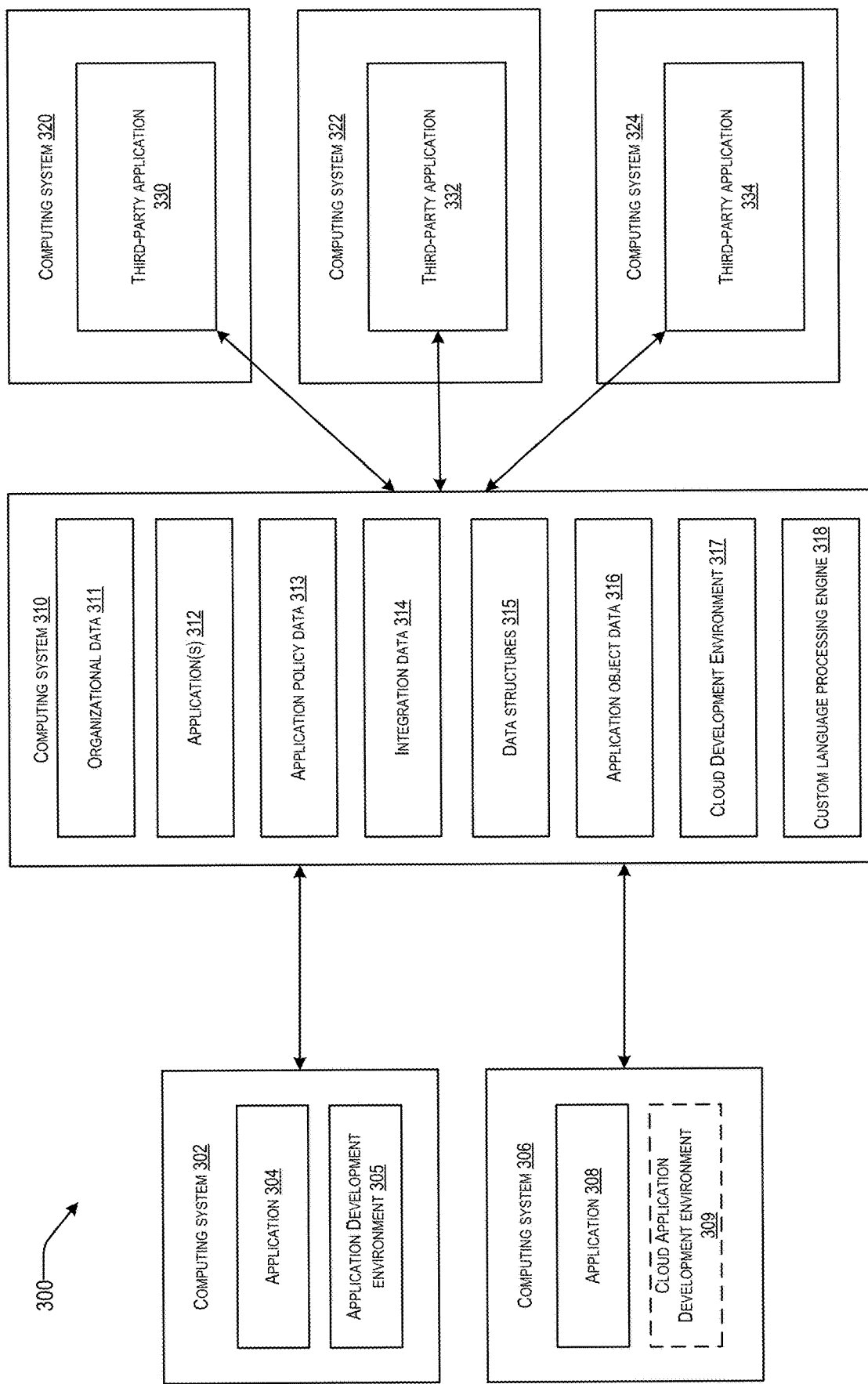
FIG. 3 depicts a block diagram of an example computing environment including multiple computing systems, according to example embodiments of the present disclosure.

FIG. 3 depicts a block diagram of an example computing environment 300 including multiple computing systems, according to example embodiments of the present disclosure. Any of computing system 302, computing system 306, computing system 310, computing system 320, computing system 322, or computing system 324 can include one or more attributes and/or capabilities of the computing system 110, the remote computing system 130, the one or more computing devices 152, and/or the computing device 200. Furthermore, any of the computing system 302, the computing system 306, the computing system 310, the computing system 320, the computing system 322, or the computing system 324 can be configured to perform one or more operations and/or one or more actions that can be performed by the computing system 110, the remote computing system 130, the one or more computing devices 152, and/or the computing device 200.

As shown in FIG. 3, the example computing environment 300 includes the computing system 302, an application 304, an application development environment 305, the computing system 306, an application 308, a cloud application development environment 309, the computing system 310, organizational data 311 (e.g., organizational data 203), one or more application(s) 312, an application policy data 313, integration data 314, data structures 315, application object data 316, a cloud development environment 317, a custom language processing engine 318, the computing system 320, the computing system 322, the computing system 324, a third-party application 330, a third-party application 332, and a third-party application 334.

In an embodiment, the computing system 302, the computing system 306, the computing system 310, the computing system 320, the computing system 322, and/or the computing system(s) 324 can be configured to communicate directly and/or via a communication network (e.g., the network 102 depicted in FIG. 1). In one embodiment, the computing system 302 includes an application 304 that is stored and/or operates on the computing system 302 and can communicate (e.g., send and/or receive data and/or information) with one or more other computing systems including the computing system 306 and/or the computing system 310. The application 304 can, for example, include an email application that performs one or more operations on the computing system 302 and includes an email account associated with an organizational record (e.g., an employee record including the name of an employee, an email access identifier, and an email passcode) that is stored as part of the organizational data 311. In an example, a user associated with the computing system 302, the computing system 306, and/or the computing system 310 can use a portion of the organizational data 311 associated with their employee record to access a corresponding account associated with one or more of application 304, application 308, and/or application(s) 312.

In an embodiment, one or more application(s) 312 provide access to, utilize, support, and/or otherwise provide various interfaces or services that enable other applications (e.g., application 304, application development environment 305, application 308, cloud application development environment 309, application(s) 312) and/or users to perform various operations and activities involving one or more custom computer languages. For example, a custom computer language (e.g., a custom query language) generally may provide users with a simplified set of computer instructions that align with or match a user's understanding of a functional or business environment, such as an organization, business, industry, sector, and/or another functional or business environment. In some embodiments, each of such one or more custom computer languages is a user language that allows users with a basic understanding of, for instance, a subject, topic, business area, organization, functional role, industry, sector, etc. to implement custom computer instructions in terms that are familiar to the users, without knowledge of a complex computer programming language, without dependence on computer programmers, without being aware of or needing to know the complexity of underlying data organization and storage, without needing to understand, implement, and/or maintain a complex web of join conditions across various sets of underlying data, etc.

In an embodiment, a custom computer language generally enables users of any skill or level with a basic knowledge of a subject area to perform one or more operations or activities associated with an application (e.g., any of applications 312). For example, a custom computer language generally may enable a user to create, update, execute, and/or otherwise implement custom queries, reports, policies, workflows, triggers, and/or other functionality and operations associated with an application. In some embodiments, a custom computer language enables a user to utilize and perform various operations involving organizational data 311. For example, one or more applications associated with an organizational data management system or any other types of applications (e.g., applications 312) generally may provide a custom computer language allowing users to perform operations based on the structure and/or relationships associated with organizational data 311.

In an embodiment, a custom computer language may allow a user to use simplified terms to query organizational data 311. In one example, a custom computer language may allow a user to obtain the name of an employee's manager with the following example query: "ORG(John Smith, Manager)", which may return "Jane Jones" as the manager of the employee. As such, a custom computer language for an application may allow a user to use simplified and familiar terms without needing to understand complex interrelationships between various types of data stored across one or more different databases and/or other types of data stores. Further, a custom computer language generally may be processed by one or more applications (e.g., application(s) 312 associated with an organizational data store) so that users do not have to specify data joins when performing various operations involving organizational data 311.

In an embodiment, a custom computer language (e.g., a custom query language) includes a function that reports quantile information based on employee information or any other type of organizational data. For example, such a function generally may be labeled as a "quantile" function, as a "percentile" function, or given any other type of label or name. The following examples generally refer to the function name as "quantile" for illustration purposes only.

In an example, a "quantile" function of a custom query language generally may return a particular quantile (e.g., decile, percentile, etc.) of organizational data (e.g., an employee, a department, etc.) in comparison to other corresponding organizational data (e.g., other employees, other departments, etc.). In one example, a "quantile" function call in a custom query language may take four arguments. For example, a first example argument of the "quantile" function may specify a particular instance of organizational data 311 such as a particular employee, a particular department, a particular contractor, a particular vendor, or any other particular instance of organizational data 311. A second example argument of the "quantile" function may specify a numeric attribute value, a derived value, or a calculated value for comparison. A third example argument of the "quantile" function may specify a logical condition that evaluates to "true" or "false" for corresponding organizational data (e.g., other employees, other departments, etc.) where the corresponding organizational data that evaluates to "true" is included when calculating quantile information. As such, corresponding organizational data that evaluates to "false" would not be included when calculating quantile information. A fourth example argument of the "quantile" function may specify a particular quantile to use for analysis. For example, the example fourth argument may specify a numeric value representing a number of buckets to use for calculating a particular quantile (e.g., the value "4" for quartiles, the value "5" for quintiles, the value "10" for deciles, the value "100" for percentiles and/or any other value for calculating a particular, specialized quantile associated with organizational data 311). The example fourth argument also could take text input indicating a particular type of quantile to utilize (e.g., "quartile", "quintile", "decile", "percentile", etc.) and is not limited to numeric values.

In one example, a signature of an example "quantile" function of a custom computer language (e.g., a custom query language) generally can be defined and/or appear as "QUANTILE({employee information}, {attribute value to compare}, {logical condition, quantile type})". For example, an example call to the "quantile" function of the custom query language generally may be invoked based on the following example custom query language statement: "QUANTILE("Denise Smith", compensation, level=$level, 10). In the example quantile function call, the first example argument specifies the name of a particular employee or individual. Other values, such as a unique employee identifier, unique contractor identifier, and/or any other type of unique identifier of a particular instance of organizational data may be utilized (e.g., unique department name, unique department id, etc.).

The second example argument in the example quantile function call indicates compensation as the attribute of the specified employee (i.e., "Denise Smith") to be compared. Also, any derived or calculated values, such as "TODAY( )— employee start date" (e.g., which calculates an employee's length of employment) may be utilized. The third example argument in the example quantile function call indicates a logical condition where the level of other employees "level" is equal "=" to the level of "Denise Smith" "$level". As such, employees at the same level as "Denise Smith" in an organizational data management system as indicated by the organizational data will be included in the QUANTILE determination of the current example. The fourth example argument in the example quantile function call "10" indicates that 10 quantiles (i.e., "deciles") are to be used in the calculation of determining how "Denise Smith's" "compensation" compares to other employees at the same level (i.e., "level=$level"). Thus, "Denise Smith" may fall into any one of 10 buckets depending on how her "compensation" compares to other employees in an organization based on organizational data 311.

The example QUANTILE function generally can return the number of the particular, specified quantile (e.g., the bucket number) based on a determination. Continuing with the current example, if "Denise Smith" had "compensation" that ranked in the top ten percent of employees at the same level (i.e., "level=$level") then "10" would be returned as the determined decile bucket of the example quantile function (or, for example if quartiles were specified instead of deciles, then "4" would be returned). Similarly, if the "compensation" of "Denise Smith" ranked last in the determination, then a "1" would be returned as the determined decile bucket of the example quantile function ("1" also would be returned if quartiles were specified instead of quintiles). In an additional example, a custom query language statement: "QUANTILE("Denise Smith", equity grant, start date <$start date+90 and start date >$start date −90 and equity grant >0, 100) returns "Denise Smith's" "equity grant" decile in comparison to other employees with start dates within 90 days of "Denise Smith's" start date where those employees have equity grants.

In an embodiment, a custom computer language is based on and/or otherwise associated with one or more data structures 315 associated with an application. For example, a custom computer language may be based on, represent, describe, or otherwise be associated with an object graph data structure (e.g., a master object graph, any one or more portions of a master object graph, etc.) and/or any other types of data structures 315 that describe the structure of an application and/or the underlying data associated with an application. In an example, a custom computer language is based on the structure of one or more applications and/or associated organizational data 311 of an organizational data management system. For example, the structure of the one or more applications and/or the associated organizational data 311 may be represented and described in one or more data structures 315 including, but not limited to, one or more independent and/or interrelated object graph data structures. In various embodiments, an application (e.g., one of application 312) and/or another supporting application used in association with the application can utilize one or more data structures 315 including, for instance, one or more object graph data structures to process and perform various underlying operations associated with custom computer language instructions.

In an embodiment, the computing system 302 includes an application development environment 305 that provides users with access to and/or operations associated with one or more computer languages including, but not limited to, a custom computer language. For example, the application development environment 305 can be associated with one or more applications of an organizational data management system that stores and manages various types of organizational data 311. In an example, application development environment 305 generally may be an application (e.g., application 304) or portion of an application that enables a user to perform various operations involving organizational data 311 of an organizational data management system using a custom computer language. For example, application development environment 305 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the application development environment 305 may run, for example, on a computing system (e.g., computing system 302) and/or in association with information, applications, and/or services on another computing system (e.g., computing system 310). For example, application development environment 305 may utilize organizational data 311, application(s) 312, application policy data 313, integration data 314, data structures 315, and/or application object data 316 available from another computing system (e.g., computing system 310, one or more computing systems associated with an organizational data management system, etc.). In at least one embodiment of the present disclosure, application development environment 305 can include specialized computer software for performing operations associated with providing and/or implementing triggers based on one-to-many and/or many-to-one relationships between entities and/or data objects in a system of record, where such specialized computer software and/or such operations associated with providing and/or implementing such triggers can be based on computer instructions in a custom computer language provided by the system of record. For example, in one embodiment, application development environment 305 also can include a query processing engine (not shown), computer instruction compiler (not shown), computer instruction generator (not shown), and/or other specialized computer software for performing operations associated with providing and/or implementing triggers based on one-to-many and/or many-to-one relationships between entities and/or data objects in a system of record (e.g., where such specialized computer software and/or such operations associated with providing and/or implementing such triggers can be based on computer instructions in a custom computer language provided by the system of record). Application development environment 305 also may utilize or work in conjunction with, in whole or in part, cloud development environment 317 and custom language processing engine 318 (e.g., including, for instance, any computer instruction compiler (not shown) and/or computer instruction generator (not shown) associated with custom language processing engine 318), and/or other features and/or operations available from another computing system (e.g., computing system 310, one or more computing systems associated with an organizational data management system, etc.).

In an embodiment, application development environment 305 can include an editor that allows users to enter, define, edit, check, store, schedule, execute, and/or perform any other operations associated with creating, viewing, maintaining, and/or utilizing computer instructions in a custom computer language. In some embodiments, application development environment 305 includes a textual editor that enables users to enter and manipulate computing instructions in a custom computer language. In some examples, a textual editor of the application development environment 305 may assist users with constructing various types of statements in a custom computer language. For example, the textual editor may provide: syntax highlighting in a custom computer language; intelligent completion of keywords or statements in a custom computer language; automated hints and examples; various types of pop-up information to assist a user in writing or editing instructions in a custom language; visual notification of syntax or other errors; suggested correction of syntax or other errors; automatic suggestion and/or population of objects and/or functions; and/or other assistance with constructing various types of statements in a custom computer language. In some examples, automation and other assistance provided by a textual editor of the application development environment 305 may be based on and may actively utilize one or more data structures 315 (e.g., an object graph based on organizational data 311) associated with implementation of a custom computer language.

In an embodiment, application development environment 305 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the application development environment 305 may provide a textual editor in combination with the visual editor to allow users to view, utilize, and alternate between both textual and visual editors of a custom query language, for example, as part of the same user interface. In some examples, application development environment 305 can parse and perform various operations involving instructions in a custom computer language alone or in association with another computing system (e.g., based on various data and/or services provided by computing system 310).

In an embodiment, the computing system 310 includes one or more application(s) 312 that can perform one or more operations on the computing system 310 and can communicate data and/or information with any one or more computing systems, including the computing system 302 and/or the computing system 306, or any one or more computing devices. The application(s) 312 can, for example, include an employee management application that operates on the computing system 310 and accesses the organizational data 311, which can include one or more organizational records associated with the names of organization employees and the respective employment statuses for each of the employees (e.g., an employee's position or role within the organization, an organizational department associated with the employee, etc.). A user (e.g., a privileged user, such as a manager or administrator with the authority to access and/or modify the organizational data 311) associated with the computing system 306 can, for example, access and/or modify the organizational data 311 to reflect one or more events that can include, but are not limited to, for instance: when an employee receives a promotion or a raise; changes to a different department; is added to one or more new teams; is assigned new computer hardware or other equipment; and/or another event associated with the employee and/or another entity and/or data object of an organization.

The one or more application(s) 312 can perform one or more operations on the computing system 310 and can communicate data and/or information with one or more computing systems, including the computing system 302 and/or the computing system 306, or any one or more computing devices. The application(s) 312 can, for example, include an administrative or other type of system application to manage one or more aspects of the application(s) 312 including, but not limited to, installing, configuring, maintaining, updating, integrating, automating, and/or performing one or more other operations associated with the application(s) 312 on the computing system 310 and that can manage one or more aspects of one or more other applications on different systems and devices, which may include the application 304 and/or the application 308.

In some embodiments, the application(s) 312 can include one or more third-party applications that are stored and/or perform operations on the computing system 310. Further, the application(s) 312 can retrieve data and/or information associated with and/or operate in cooperation with applications external to the computing system 310 (e.g., the computing system 302 and/or the computing system 306). The application(s) 312 can also use (e.g., access, modify, and/or control) the organizational data 311. For example, the application(s) 312 can use the organizational data 311 that is associated with the application 304 to perform one or more operations using the application 308 that is on the computing system 306.

In an embodiment, the computing system 306 includes a cloud application development environment 309. For example, the cloud application development environment 309 generally may be a local instance of an online integrated development environment (e.g., a cloud development environment 317) provided by a computing system (e.g., computing system 310) that is accessed from a web browser and/or any other type of application 308 on another computing system (e.g., computing system 306). For example, the cloud application development environment 309 can be associated with one or more applications of an organizational data management system that stores and manages various types of organizational data 311. In an example, cloud application development environment 309 generally may be an application (e.g., application 308) or portion of an application that enables a user to perform various operations involving organizational data 311 of an organizational data management system using a custom computer language. For example, cloud application development environment 309 generally may enable a user to create, update, execute, and/or otherwise implement custom queries, reports, policies, workflows, triggers, rules, group assignments, and/or other functionality and operations associated with one or more applications of an organizational data management system.

In various embodiments, any one or more parts of the cloud application development environment 309 may run, for example, on a computing system (e.g., computing system 306) and/or in association with information, applications, and/or services on another computing system (e.g., computing system 310). For example, cloud application development environment 309 may utilize organizational data 311, application(s) 312, application policy data 313, integration data 314, data structures 315 and/or application object data 316 available from another computing system (e.g., computing system 310, one or more computing systems associated with an organizational data management system, etc.). In at least one embodiment of the present disclosure, cloud application development environment 309 can include specialized computer software for performing operations associated with providing and/or implementing triggers based on one-to-many and/or many-to-one relationships between entities and/or data objects in a system of record, where such specialized computer software and/or such operations associated with providing and/or implementing such triggers can be based on computer instructions in a custom computer language provided by the system of record. For example, in one embodiment, cloud application development environment 309 also can include a query processing engine (not shown), computer instruction compiler (not shown), computer instruction generator (not shown), and/or other specialized computer software for performing operations associated with providing and/or implementing triggers based on one-to-many and/or many-to-one relationships between entities and/or data objects in a system of record (e.g., where such specialized computer software and/or such operations associated with providing and/or implementing such triggers can be based on computer instructions in a custom computer language provided by the system of record). Cloud application development environment 309 also may utilize or work in conjunction with, in whole or in part, cloud development environment 317 and custom language processing engine 318 (e.g., including, for instance, any computer instruction compiler (not shown) and/or computer instruction generator (not shown) associated with custom language processing engine 318), and/or other features and or operations available from another computing system (e.g., computing system 310, one or more computing systems associated with an organizational data management system, etc.).

In an embodiment, cloud application development environment 309 can include an editor that allows users to enter, define, edit, check, store, schedule, execute, and/or perform any other operations associated with creating, viewing, maintaining, and/or utilizing computer instructions in a custom computer language. In some embodiments, cloud application development environment 309 includes a textual editor that enables users to enter and manipulate computing instructions in a custom computer language. In some examples, a textual editor of the cloud application development environment 309 may assist users with constructing various types of statements in a custom computer language. For example, the textual editor may provide: syntax highlighting in a custom computer language; intelligent completion of keywords or statements in a custom computer language; automated hints and examples; various types of pop-up information to assist a user in writing or editing instructions in a custom language; visual notification of syntax or other errors; suggested correction of syntax or other errors; automatic suggestion and/or population of objects and/or functions; and/or other assistance with constructing various types of statements in a custom computer language. In some examples, automation and other assistance provided by a textual editor of the cloud application development environment 309 may be based on and may actively utilize one or more data structures 315 (e.g., an object graph based on organizational data 311) associated with implementation of a custom computer language.

In an embodiment, cloud application development environment 309 can include a visual editor (e.g., either with or without a textual editor) to, for example, create, view, maintain, and/or utilize computer instructions in a custom computer language. For example, the visual editor may allow users to build, modify, and perform other operations associated with instructions in a custom computer language via a drag and drop and/or any other types of graphical user interfaces (e.g., a software wizard or setup assistant user interface that presents a user with a sequence of dialog boxes or other types of interfaces that guide the user through a series of steps in generating one or more portions of an application). Further, a visual editor generally also may provide dropdown lists, enhanced browsing, and other visual access to features and operations of a custom computer language, and/or one or more data structures 315 associated with a custom computer language or related application to construct, edit, and/or otherwise utilize instructions in a custom computer language. In some examples, the cloud application development environment 309 may provide a textual editor in combination with the visual editor to allow users to view, utilize, and alternate between both textual and visual editors of a custom query language, for example, as part of the same user interface.

The computing system 310 includes the application policy data 313 which can be implemented on the computing system 310 and can be used to perform one or more operations associated with implementing an application policy associated with the organizational data 311 and/or one or more applications including the application 304, the application 308, and/or application(s) 312. The application 304, the application 308, and/or application(s) 312 can include one or more third-party applications that are separate from, that are operated separate and apart from, and that are not affiliated with the organization that manages, owns, controls, and/or maintains the organizational data 311 or an associated organizational data management application on the computing system 310, and/or that determines or implements an application policy associated with the application policy data 313. In one example, third-party applications can be differentiated from organizational applications that, for example, are inherent to, are a part of, or otherwise operate directly or as part of an organizational data management application, system, services, and/or platform.

The application policy data 313 can include one or more rules that determine how one or more applications including, for example, one or more third-party applications or organizational applications are accessed, modified, and/or controlled. For example, the application policy data 313 can use the organizational data 311 that is associated with the application 304 to perform one or more operations on the application(s) 312 and/or the application 308. Also, the application policy data 313 can use the organizational data 311 that is associated with the application(s) 312 to perform one or more operations on the application 304 and/or the application 308. By way of further example, the application policy data 313 can use the organizational data 311 that is associated with the application 308 to perform one or more operations on the application 304 and/or the application(s) 312. In some embodiments, the application policy data 313 can determine how a combination of one or more organizational applications and/or one or more third-party applications are accessed, modified, configured, and/or controlled. For instance, in these or other embodiments, the application policy data 313 can determine how one or more applications owned and controlled by an organization that owns and controls the organizational data 311 and/or applications provided with or as part of an organizational data management system used by the organization as a system of record for maintaining the organizational data 311 are accessed, modified, configured, and/or controlled.

The computing system 310 includes the integration data 314, which can reside on the computing system 310 and can be used, for example, to perform one or more operations that integrate the organizational data 311 and associated activities based on the organizational data 311 across one or more different computing systems (e.g., such as computing system 302, computing system 306, and computing system 310) and/or applications (e.g., such as application 304, application 308, and application(s) 312). For example, the integration data 314 can be used to integrate and synchronize organizational data 311 and/or associated operations across an organizational data management application or system (e.g., a system of record for organization data 311) and each of one or more separate third-party applications that utilize organizational data 311 and/or perform operations based on organizational data 311.

In an embodiment, the integration data 314 can include configuration information associated with integrating and synchronizing data among one or more computing systems and/or applications. For example, the integration data 314 can include information that enables integration between an organizational application (e.g., an application 312 associated with an organizational data management system of record for the organizational data 311) and each of one or more separate third-party applications (e.g., application 304, application 308, etc.) that use or perform operations based on the organizational data 311). In some embodiments, such integration data 314 may include, but is not limited to, information indicating and/or describing various data that enables performance of an integration between applications or systems such as, for instance: an integration type information (e.g., flat file, application programming interface or "API", webhook, system call, etc.); security information (e.g., authentication information, encryption information, etc.); technical information (e.g., file locations, call information, system naming, application naming, IP address information, port information, etc.); integration flow information (e.g., push, pull, bidirectional, etc.); integration activation (e.g., scheduling or timing information, event information, one or more rules, one or more triggers or criteria, etc.); processing information (e.g., data mappings between the source and target, data validation rules, data transformations, error handling, etc.); and/or any other information used in defining, configuring, and/or integrating an application with each of any number of third-party applications and/or systems.

The computing system 310 includes the data structures 315, which can be implemented on the computing system 310 and used to perform operations involving the organizational data 311 including, but not limited to, for instance: performing integration and synchronization of the organizational data 311 with one or more different third-party applications and/or systems; generating and processing computer instructions across one or more different systems based on the organizational data 311; and/or another operation involving the organizational data 311. In an embodiment, the data structures 315 generally can include information about the properties or attributes of each of one or more entities associated with the organizational data 311. Data structures 315 also can include information describing relationships associated with one or more entities associated with the organizational data 311 (e.g., explicit relationships defined between entities, virtual relationships determined based on various attributes and data associated with entities, etc.). In some embodiments, the data structures 315 generally can be used in validating and processing the organizational data 311 and/or other information received from third-party applications and/or systems. The data structures 315 also can be used in association with performing or otherwise carrying out one or more operations involving the organizational data 311 including, but not limited to, processing requests, validating queries, generating computer instructions, processing computer instructions, generating workflows, executing workflows, generating triggers, evaluating trigger conditions, performing trigger operations, creating reports, running reports, and/or another operation involving the organizational data 311.

In an embodiment, the data structures 315 can include one or more object graphs and/or any other types of data structures that provide information about entities, relationships, rules, constraints, and/or any other aspects of managing the organizational data 311. For example, such object graphs and/or data structures can include one or more nodes (e.g., data objects) representing entities associated with the organizational data 311 and one or more edges that connect and represent relationships between the nodes (e.g., explicit edges defining relationships between entities and data, virtual edges inferring relationships between entities and data, etc.). The data structures 315 can also include organizational data and/or associated metadata. In addition, the data structures 315, together or alone, generally may represent one or more structural aspects of an application or system (e.g., such as an organizational data management system that is a system of record for organizational data 311 of an organization). In various examples, the data structures 315 generally may be used to support various operations performed by a system of record including, but not limited to, performing one or more operations for providing and/or implementing triggers based on one-to-many and/or many-to-one relationships between entities and/or data objects in the system of record. For example, the data structures 315 alone or in combination with configuration data and/or one or more other types of information may be used to generate new instructions in a computer language, which may include a custom computer language provided to users. Further, such new instructions generally may include one or more operations (e.g., one or more underlying data joins) that are identified and included in the generated instructions based on analyzing instructions received in the custom computer language in view of the data structures 315.

The computing system 310 includes the application object data 316, which can be implemented on the computing system 310. For example, the application object data 316 can include any information that is used to implement any type of application object or data structure for an application object that may store, reference, utilize, and/or process data. In an example, a system of record generally may support application objects that include, but are not limited to, application triggers, application reports, application workflows, application tasks, custom objects, and/or any other type of object.

In an embodiment, application triggers generally may include application objects that are referenced based on an event. For example, an application trigger may be referenced: based on (e.g., in response to) one or more internal application or system events (e.g., occurring within a system of record, etc.); based on (e.g., in response to) one or more external application or system events (e.g., occurring outside of a system of record, occurring in a third-party application integrated with a system of record, etc.); based on (e.g., in response to) a combination of one or more internal application or system events and one or more external application or system events; and/or based on (e.g., in response to) another event.

Generally, an application trigger may include one or more conditions to be evaluated when the application trigger is referenced by an application or system. For example, such conditions may include, but are not limited to, conditional statements that test one or more aspects of organizational data 311. In one example, when the application trigger is referenced and the conditions of the application trigger are satisfied (e.g., evaluate to true), then one or more operations associated with the trigger are automatically executed. For example, the one or more operations associated with the application trigger may cause an application or system to perform one or more operations internally, may cause the application or system to perform one or more operations in association with an external application or system (e.g., based on an integration, etc.), or may cause the application or system to perform one or more operations internally and to perform one or more operations with an external application or system.

In at least one embodiment of the present disclosure, the application trigger can include a one-to-many operator that associates a first entity and/or data object with multiple second entities and/or data objects, where the application trigger can be defined based at least in part on the one-to-many operator and a custom computer language supported by, for instance, application 304, application 308, one or more applications 312, and/or another application of example computing environment 300. For example, in this or another embodiment, the application trigger can include a one-to-many operator that associates a first node of data structures 315 that represents a first entity of an organization in organizational data 311 with multiple second nodes of data structures 315 that represent multiple second entities of the organization in organizational data 311, where the application trigger can be defined based at least in part on the one-to-many operator and a custom computer language supported by, for instance, application 304, application 308, one or more applications 312, and/or another application of example computing environment 300.

In at least one other embodiment of the present disclosure, the application trigger can include a many-to-one operator that associates multiple first entities and/or data objects with a second entity and/or data object, where the application trigger can be defined based at least in part on the many-to-one operator and a custom computer language supported by, for instance, application 304, application 308, one or more applications 312, and/or another application of example computing environment 300. For example, in this or another embodiment, the application trigger can include a many-to-one operator that associates multiple first nodes of data structures 315 that represent multiple first entities of an organization in organizational data 311 with a second node of data structures 315 that represents a second entity of the organization in organizational data 311, where the application trigger can be defined based at least in part on the many-to-one operator and a custom computer language supported by, for instance, application 304, application 308, one or more applications 312, and/or another application of example computing environment 300.

In an embodiment, application reports generally may include any computer instructions that are executed by an application or system to obtain a collection of data or the resulting collection of data. Application workflows generally may refer to an object or objects that define a sequence of steps for automating a process associated with an application or system. Application tasks generally may be objects that are used to define one or more actions or pieces of work to be performed by a user or group of users. Application tasks may be assigned or delegated to one or more users or groups of users. Application tasks also may include information related to a particular task (e.g., start date, due date, etc.). Applications and systems may allow a user of an organization to create custom objects, which may define one or more custom object attributes, custom object operations, and relationships with entities provided by an application or system and/or other custom objects defined for an organization.

The computing system 310 includes the cloud development environment 317, which can be implemented on the computing system 310, for example, to provide users with access to an environment for writing, building, testing, executing, and/or performing any other types of operations involving instructions in a custom computer language. In an embodiment, the cloud development environment 317 may include and/or perform operations associated with the custom language processing engine 318 and, for example, any computer instruction compiler (not shown) and/or any computer instruction generator (not shown) associated with custom language processing engine 318. In addition, the cloud development environment 317 may run on one computing system (e.g., computing system 310) and provide one or more services to applications running on another computing system (e.g., application development environment 305 on computing system 302, cloud application development environment 309 on computing system 306, etc.).

Further, the cloud development environment 317 may perform any one or more of the operations previously described with respect to application development environment 305 and/or cloud application development environment 309. Similarly, application development environment 305 and/or cloud application development environment 309 may perform any one or more of the operations described in association with cloud development environment 317.

The computing system 310 includes the custom language processing engine 318, which can be implemented on the computing system 310 and used to perform operations associated with processing requests based on instructions in a custom computer language. In various embodiments, the custom language processing engine 318 may receive requests for processing that include one or more instructions in a custom computer language. For example, such requests may be received from one or more different computing systems (e.g., computing system 302, computing system 306, computing system 310, etc.) and/or one or more different applications (e.g., application 304, application development environment 305, application 308, cloud application development environment 309, application(s) 312, cloud development environment 317, etc.). Custom language processing engine 318 may be associated with or utilize one or more computer instruction compilers (not shown) and/or one or more computer instruction generators (not shown), which for example, may be separate, part of, or integrated with the custom language processing engine 318.

In an embodiment, a computer instruction compiler of the custom language processing engine 318, can be implemented on the computing system 310 and used to perform operations associated with analyzing instructions in a custom computer language including, but not limited to, parsing and analyzing custom computer language instructions based on one or more rules associated with a custom computer language and/or associated data structures 315 to, for example: determine whether any error exists in the custom computer language instructions; identify one or more errors in the custom computer language instructions; return information about one or more of the identified errors; determine when the custom computer language instructions are free from error; and/or to complete another operation. The computer instruction compiler of the custom language processing engine 318 may include or be associated with a computer instruction generator (not shown) that generates one or more new instructions in a computer language, such as a custom computer language.

In an embodiment, a computer instruction generator of the custom language processing engine 318, can be implemented on the computing system 310 and used to generate one or more new instructions in a custom computer language. For example, the computer instruction generator may generate instructions in a custom computer language for execution based on configuration of one or more application objects and/or data associated with such application objects (e.g., application triggers, application reports, application workflows, application tasks, custom objects, etc.). In one example, such instructions in the custom computer language may be executed by an application of a system of record to perform one or more operations involving the system of record and/or any third-party application integrated with the system of record. In one example, the computer instruction generator may generate instructions in any computer language, for example, to be executed in association with any application or computing system. For example, the computer instruction generator may generate instructions in a different computer language for execution with one or more other applications 312 or data stores (not shown) on or associated with computing system 310 and/or one or more other applications (e.g., application 304, application 308, third-party application 330, third-party application 332, third-party application 334) associated with other computing systems (e.g., computing system 302, computing system 306, computing system 320, computing system 322, computing system 324).

In various examples, third-party applications (e.g., third-party application 330, third-party application 332, third-party application 334) generally may be any type of computer application referenced within the present disclosure or otherwise available. In some examples, each third-party application may be associated with a respective computing system (e.g., computing system 320, computing system 322, computing system 324). In some examples, each third-party application may be associated with one or more different computing systems. In some examples, multiple third-party applications may run on each of one or more different computing systems.

In an embodiment, an application store computing system (not shown) provides an organization with access to multiple different integration applications (not shown) for integrating organizational data 311 and/or associated processes with and across various applications and/or systems (e.g., application(s) 312, third-party application 330, third-party application 332, third-party application 334, etc.). An application store computing system also may provide an organization with one or more other types of applications, including but not limited to, platform utility apps that provide additional functionality to an organizational data management application or system, other apps that may include integration-related applications, and/or any other types of applications. Generally, the application store computing system may provide one or more various applications for a flat fee, based on a subscription purchase, for a fee based on usage, for a fee based on a number of users, computing systems, processors, or any other criteria, as part of a limited trial, for free, and/or generally under any type of arrangement. In an embodiment the application store computing system is managed and provided by the same party that provides an organizational data management system to organizations. For example, the integration applications provided by the application store computing system generally may be specialized for use with the organizational data management system (e.g., and not end-user versions of applications that would be installed for general purpose use by end-users on end-user devices or for use by end-users via cloud services or any other types of services).

In an embodiment, the integration applications generally can be any application that allows an organization to manage any one or more aspects associated with providing one or more corresponding end-user applications to individual members (e.g., employees), teams, roles, departments, and/or any other grouping or categorization of individuals in an organization. For example, each of the integration applications can be used by an organization to control and automate various tasks associated with provisioning, configuring, maintaining, and integrating third-party applications. In some embodiments, one or more of the integration applications can allow an organization to configure automated assignment of a corresponding end-user application to one or more individuals, user account creation, single sign-on setup, provisioning, installation, setup, and/or maintenance of corresponding end-user applications (e.g., third-party applications or other applications available for use by end users) provided to particular individuals, groups, and/or one or more devices associated with such individuals or groups in the organization (e.g., via installation on respective user devices, via a cloud application service available to end users, etc.).

In an embodiment, one or more of the integration applications can provide integration of organizational data 311 and associated services with one or more corresponding third-party applications (e.g., application 304 on computing system 302, application 308 on computing system 306, application(s) 312 on computing system 310, third-party application 330 on computing system 320, third-party application 332 on computing system 322, third-party application 334 on computing system 324, etc.) that utilize and/or perform operations based on organizational data 311. For example, each of the integration applications can provide one or more of user account creation, single sign-on integration, user account suspension or removal, user management, group management, user privileges, user data access, user data control, template management, data integration, process automation, and/or any other types of integration between applications (e.g., third-party applications or other applications) that are associated with organizational data 311 of an organization.

In an embodiment, the integration applications and/or other applications provided by the application store computing system may include, but are not limited to, collaboration apps, support apps, design apps, development apps, finance and legal apps, human resources (HR) and benefits apps, information technology (IT), device management, and security apps, office management apps, sales and marketing apps, charitable apps, platform utility apps, and/or other apps. Generally, various different types of applications provided by the application computing system may be organized, categorized, grouped, presented, and/or otherwise offered in any type of arrangement, and thus are not limited to any particular examples discussed herein, which are provided for illustration purposes only.

In an embodiment, collaboration apps may include, for example, any applications that provide scheduling, communications, document sharing and management, electronic signature services, project management, productivity, and/or any other types of applications that facilitate work between individuals, groups, and/or parties.

In an embodiment, support apps may include, for example, any applications that provide services associated with customer support, technical support, issue reporting, issue management and escalation, tracking and managing help desk tickets, and/or any other types of applications that facilitate customer, business, and/or technology support.

In an embodiment, design apps may include, for example, any applications that provide services associated with creating graphic designs, product designs, prototypes, drawings, graphical user interfaces, user experiences, and/or any other types of applications that facilitate the creation of designs, interfaces, and/or artistic works.

In an embodiment, development apps may include, for example, any applications that provide services associated with software development, software testing, source code control and management, source code scanning, application testing, process automation, cloud hosting and services, system monitoring, error reporting and alerts, machine learning, and/or any other types of applications that facilitate activities associated with building, maintaining, or deploying software applications.

In an embodiment, finance, operational, and legal apps may include, for example, any applications that provide services associated with accounting systems, budgeting systems, vendor management systems, payment systems, travel systems, expense management systems, supply chain systems, manufacturing systems, compliance and governance systems, vendor management systems, contract management systems, and/or any other types of applications and/or systems used to manage various aspects of an organization.

In an embodiment, human resources (HR) and benefits apps may include, for example, any applications that provide services associated with recruiting and hiring, temporary staffing, background checks, payroll and benefits, training and onboarding, retirement planning and contributions, reward and bonus programs, employee training, learning management systems, performance management, time and attendance, and/or systems any other types of applications or systems associated with employee-related activities.

In an embodiment, information technology (IT), device management, and security apps may include, for example, any applications that provide services associated with device management, technology, information security, password management, and/or any activities associated with managing applications, systems, devices, or associated technology.

In an embodiment, office management apps may include, for example, any applications that provide services associated with facilities management, receptionist services, physical access, visitor access, catering services, office layout, office assignments, and or any other types of applications or systems associated with performing office management.

In an embodiment, sales and marketing apps may include, for example, any applications that provide services associated with social media, analytics, advertising, event management, customer relationship management, content creation and distribution, public relations, business generation, campaign management, and/or any other types of similar or related activities.

In an embodiment, charitable apps may include, for example, any applications that provide services associated with donations, charitable giving, crowdfunding, and/or other charitable services.

In an embodiment, platform utility apps may include, for example, any applications from a provider that allow an organization to utilize software applications, systems, or services that have been purchased or that are otherwise available from the provider. For example, a provider of an organizational data management system can allow an organization to access and utilize standard services and/or enhanced services via one or more of the platform utility apps. In some embodiments, the platform utility apps operate from and/or are directly integrated with applications, systems, and/or services obtained from a provider. For example, such platform utility apps can allow one or more users of an organization to customize a particular implementation or instance of provider software that is associated with the organization. In one example, one of the platform utility apps can allow the creation and/or modification of one or more custom fields in association with one or more entities, the creation and/or modification of one or more relationships among the entities, the creation and/or modification of one or more default system rules or custom rules, the addition and/or use of custom fields, custom relationships and/or custom rules in various workflows, triggers, tasks, reports, integrations, etc. In some embodiments, users may create and modify custom fields, relationships, rules, tables, entities, and any other various aspects of an organizational data management system in a utility application or otherwise using a custom computer language provided by the organizational data management system.

In an embodiment, other apps may include, for example, any types of applications that may be used by individuals and/or organizations. The other apps may include, for example, any other category of integration applications and/or any other types of applications that can be executed by a computing system or device.

In an embodiment, authorized users of an organization with the appropriate privileges may access one or more services of the application store computing system directly, for example, via a website, web page, desktop application, mobile application, and/or any other type of application to browse, view, search, compare, evaluate, download, install, configure, upgrade, uninstall, and/or perform any other types of activities associated with the integration applications or any other types of applications provided via the application store computing system. In some embodiments, authorized users of an organization with the appropriate privileges may access one or more services of the application store computing system indirectly, for example, through another application (e.g., application(s) 312) and/or another computing system (e.g., computing system 310). In some embodiments, the application store computing system can be provided on the same computing system with other applications and services (e.g., running on computing system 310).

In an embodiment, any one or more users of an organization, such as an administrator, manager, or one or more other users associated with a particular role and/or one or more particular privileges each may install and/or configure each of one or more different integration applications for use by the organization. For example, any such user with the appropriate privileges may install one or more of the integration applications for the organization on the computing system 310 or any other computing systems or devices. In one or more additional and/or alternative embodiments, any such user with the appropriate privileges may configure integration data 314 associated with each of one or more integration applications. In some embodiments, one user with the appropriate privileges may delegate authority to one or more other users to perform installation and/or configuration of one or more of the integration applications for an organization.

In an embodiment, an organizational data management system is provided via at least one computing system to allow each of one or more different organizations to centrally manage their own organizational data 311. For example, the organizational data management system can be provided as a centralized system of record for storing and managing various types of organizational data 311 of an organization. The organizational data management system also can provide various types of integration across different third-party applications that utilize organizational data 311, that perform processing involving or based on organizational data 311, and/or that are otherwise associated with organizational data 311. The organizational data management system also can automate various processing based on the organizational data 311 including, but not limited to, the automation of processing performed across various third-party applications based on the organizational data 311. In various embodiments, the organizational data management system can be provided via one or more different computing systems, one or more different applications, and/or via one or more different services, for example, to one or more different organizations over a computer network.

In an embodiment, a separate instance of an organizational data management system generally can be provided to each of one or more different organizations, for example, to allow each organization to independently configure, manage, and integrate their own instance of an organizational data management system, and to secure and insulate organizational data 311 from outside parties. For example, separate instances of an organizational data management system generally may be provided to different organizations using different computer hardware devices, different software applications, different instances of software applications running in an isolated space, different databases, physically partitioned databases, and/or in various other ways.

In an embodiment, an organizational data management system generally enables organizations to efficiently manage organizational data 311 and associated processing that occurs based on the organizational data 311. For example, an organizational data management system may be used as a centralized system of record that is integrated with other computing systems and applications (e.g., third-party application 330, third-party application 332, third-party application 334, etc.) that generate, utilize, process, and/or perform activities based on organizational data 311. Such integration generally allows an organizational data management system to orchestrate and automate processing of organizational data 311 and associated activities across numerous different applications that are not in communication or coordination with one another. In some embodiments, an organizational data management system can allow appropriate users (e.g., authenticated, authorized, privileged, etc.) of an organization to manage, for example, organization information, settings of an organizational data management system, onboarding of employees, offboarding of employees, employee information, organizational structure and locations, employee placement in departments and teams, workflows and tasks, reports, documents, and/or any other information associated with organizational data 311.

In an embodiment, an organization uses an organizational data management system that allows the organization to manage organizational data 311 and activities performed based on the organizational data 311. In some embodiments, an organization can install and use an organizational data management system on a computing system (e.g., computing system 310 or any other computing system) that is dedicated to the organization. In one or more additional and/or alternative embodiments, an organizational data management system can comprise any one or more of organizational data 311, application(s) 312, application policy data 313, integration data 314, data structures 315, application object data 316, cloud development environment 317, custom language processing engine 318, and/or any other information associated with managing, processing, and performing activities associated with organizational data 311. In addition, an organizational data management system may provide and utilize its own custom computer language that allows users to access and perform various operations using simplified computer instructions based on structure of organizational data 311. Further, an organizational data management system may provide various features and user interfaces to configure and to automate the execution of triggers in the custom computer language to perform various activities within the organizational data management system and across one or more other applications (e.g., third-party application 330, third-party application 332, third-party application 334, etc.) running on one or more different computing systems (e.g., computing system 320, computing system 322, computing system 324, etc.).

In one example, the above-described features and user interfaces can allow a user to configure one or more conditions and one or more operations of a trigger using a one-to-many operator of the custom computer language to define the trigger based on a one-to-many relationship between a first entity and/or data object (e.g., a first node of data structures 315) and multiple second entities and/or data objects (e.g., multiple second nodes of data structures 315) of organizational data 311. In another example, such features and user interfaces can allow a user to configure one or more conditions and one or more operations of a trigger using a many-to-one operator of the custom computer language to define the trigger based on a many-to-one relationship between multiple first entities and/or data objects (e.g., multiple first nodes of data structures 315) and a second entity and/or data object (e.g., a second node of data structures 315) of organizational data 311.

In an embodiment, an organizational data management system may be provided by another party for use by an organization. For example, another party such as a software application provider may host or otherwise provide a separate instance of an organizational data management system to each of one or more different organizations allowing each organization to independently manage their own organizational data 311. In such embodiments, each separate instance of an organizational data management system provided to an organization can respectively comprise any one or more of organizational data 311, application(s) 312, application policy data 313, integration data 314, data structures 315, application object data 316, and/or any other information associated with managing, processing, and performing activities associated with organizational data 311 for the particular organization. As such, an organizational data management system may be a cloud-based platform that maintains organizational data 311 and other information associated with each of one or more different organizations and that allows each of the different organizations to independently manage their own respective organizational data 311 and related processes independently from any other organization.

Figure 4:
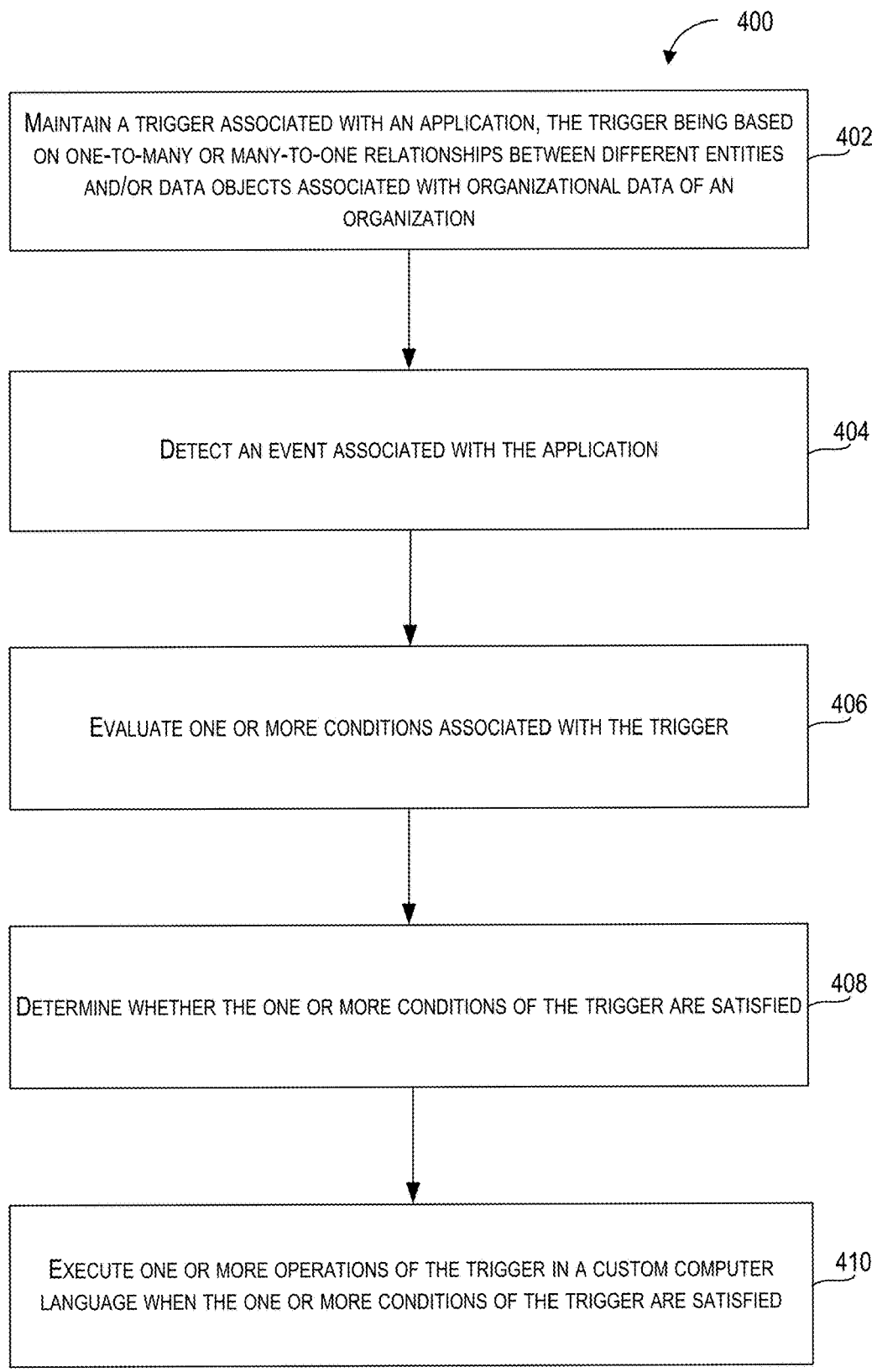
FIG. 4 depicts a flow diagram of an example method for providing triggers based on one-to-many and/or many-to-one relationships between entities and/or data objects in a system of record that manages organizational data, according to example embodiments of the present disclosure.

FIG. 4 depicts a flow diagram of an example method 400 for providing triggers based on one-to-many and/or many-to-one relationships between entities and/or data objects in a system of record that manages organizational data, according to example embodiments of the present disclosure. One or more portions of the method 400 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 400 can be executed or implemented as an algorithm on the hardware devices or systems disclosed herein. FIG. 4 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 402, a computer system (e.g., computing system 110, computing system 310, etc.) maintains a trigger associated with an application, where the trigger can be based on one-to-many or many-to-one relationships between different entities and/or data objects associated with organizational data of an organization. In an embodiment, the computer system creates and maintains one or more trigger application objects for use with an application providing services for a system of record. For example, the application may be associated with an organizational data management system that serves as a system of record for managing organizational data 311 and utilization of the organizational data across multiple different applications. In this example, the computer system can create and maintain such one or more trigger application objects based on one-to-many or many-to-one relationships between different entities and/or data objects associated with organizational data 311. For instance, the computer system can create and maintain such one or more trigger application objects based on one-to-many or many-to-one relationships between different nodes of data structures 315 that represent different entities of an organization in organizational data 311.

In at least one embodiment, the above-described trigger can include one or more conditions for activation of the trigger, one or more operations for execution based on the activation of the trigger (e.g., one or more tasks, functions, workflows, etc.), and/or a one-to-many operator (e.g., one of the "ANY," "EXTRACT," "AGGREGATE," "COUNT," "MOST RECENTLY USED," and/or "MOST RECENTLY ASSIGNED" operators described above with reference to FIG. 1) that associates a first entity and/or data object with multiple second entities and/or data objects of the organizational data. In this or another embodiment, the trigger can be defined based at least in part on the one-to-many operator. In this or another embodiment, the one or more operations and/or the one-to-many operator can be based on a custom computer language supported by the application.

In another embodiment, the above-described trigger can include one or more conditions for activation of the trigger, one or more operations for execution based on the activation of the trigger (e.g., one or more tasks, functions, workflows, etc.), and/or a many-to-one operator (e.g., one of the "ANY," "EXTRACT," "AGGREGATE," "COUNT," "MOST RECENTLY USED," and/or "MOST RECENTLY ASSIGNED" operators described above with reference to FIG. 1) that associates multiple first entities and/or data objects with a second entity and/or data object of the organizational data. In this or another embodiment, the trigger can be defined based at least in part on the many-to-one operator. In this or another embodiment, the one or more operations and/or the many-to-one operator can be based on a custom computer language supported by the application.

In an embodiment, the computer system may provide one or more types of user interfaces that allow users of an organization to configure triggers associated with an application, where the triggers can be based on one-to-many or many-to-one relationships between different entities and/or data objects associated with organizational data of the organization. For example, the computer system may provide any one or more different types of command line interfaces, editor interfaces, graphical user interfaces, and/or wizard user interfaces (e.g., alone or in combination) that allow users to write, create, edit, modify, submit, test, store, deploy, disable, enable, execute and/or perform any other actions to create and utilize such triggers associated with an application.

In an embodiment, the computer system provides graphical user interfaces that enable a user to configure various aspects of application triggers. For example, one or more graphical user interfaces may enable a user to configure conditions and operations associated with respective triggers. For instance, the computer system can provide graphical user interfaces that enable the user to configure an application trigger such that the application trigger and/or one or more aspects thereof (e.g., conditions, operations, etc.) are based on one-to-many or many-to-one relationships between different entities and/or data objects (e.g., between different nodes of data structures 315) associated with organizational data (e.g., organizational data 311) of an organization. In one example, the computer system can provide graphical user interfaces that enable the user to configure such an application trigger and/or one or more aspects thereof (e.g., conditions, operations, etc.) using a one-to-many operator or a many-to-one operator of a custom computer language supported by an application associated with the application trigger, the graphical user interfaces, and/or the computer system (e.g., a custom computer language used to manage organizational data 311).

In some embodiments, the computer system can provide one or more graphical user interfaces that can enable a user to test and review various performance or expected performance of respective triggers (e.g., respective triggers that have been configured based on one-to-many or many-to-one relationships between entities and/or data objects). In one or more additional and/or alternative embodiments, one or more graphical user interfaces may enable users to approve high-risk triggers for use and to deploy triggers. In an example, one or more of the various graphical user interfaces may generate instructions for a trigger in a computer language, such as a custom computer language for managing organizational data 311, where the trigger can be based on one-to-many or many-to-one relationships between different entities and/or data objects (e.g., between different nodes of data structures 315) associated with organizational data 311. Such generated instructions then may be utilized by an organizational data management system that supports the custom computer language to implement the triggers.

In an embodiment, the above-described trigger that can be based on one-to-many or many-to-one relationships between entities and/or data objects can generally be described as an application object or associated data structure that performs one or more actions in response to or based on an event, a condition, or a combination of an event and a condition. As an example, such a trigger may perform one or more operations based on a change to one or more data fields. In another example, such a trigger also may perform one or more operations when one or more conditions associated with the trigger are satisfied. In another example, such a trigger also may perform one or more operations, for instance, based on evaluating conditions of the trigger in response to an event and determining that the conditions associated with the trigger are satisfied. In various examples, when the conditions of such a trigger are satisfied, then the trigger is activated, causing one or more operations associated with the trigger to be executed. For example, such operations may include, but are not limited to, updating organizational data 311 in a system of record, performing one or more operations in a system of record based on organizational data 311, updating or causing the updating of organizational data 311 in one or more applications external to a system of record (e.g., third-party applications) based on organizational data 311, and or performing or causing the performing of one or more operations in one or more applications external to a system of record based on organizational data 311.

At 404, a computer system (e.g., computing system 110, computing system 310, etc.) detects an event associated with the application. In an embodiment, a detected event may include any user-generated event, such as a command or action taken by a user to generate the event. For example, a user may submit an instruction or perform an action involving a user interface to initiate an event such as running one or more triggers.

In an embodiment, a detected event may include a scheduled event that runs at a particular time or at one or more recurring times. For example, a system may periodically determine whether to evaluate a group of one or more triggers (e.g., a plurality of the above-described trigger) based on scheduling information. In one example, evaluation of a certain group of such one or more triggers may be initiated based on a date change.

In an embodiment, a detected event also may include an internal event that occurs in an application. For example, internal events associated with an application may include, but are not limited to, progression of a workflow, completion of a workflow, assignment of a task, update of a task status, completion of a task, the evaluation of another trigger, the firing of another trigger (e.g., implementation of another trigger), approval of a request, denial of a request, generation of one or more alerts, transmission of one or more alerts, generation of one or more messages, transmission of one or more messages, any update(s) to organizational data 311, and/or any other type of internal event associated with an application. In one example, a change to respective values associated with one or more attributes of a particular instance of an entity in organizational data 311, or a change to one or more values associated with a formula or other type of calculation associated with organizational data 311 may be a detected event. For example, any change to organizational data 311 may initiate analysis (e.g., via the above-described trigger) to determine whether such change is associated with and/or affects a dependency existing in the organizational data 311. In one example, an application may reference one or more data structures 315 (e.g., an object graph, one or more nodes of an object graph) associated with an application based on a modification to organizational data 311 to determine one or more dependencies in the organizational data 311 to be updated based on the modification. For example, an update to an attribute value may be used to identify and update other dependent attributes, custom fields, and formulas associated with the updated attribute.

In an embodiment, a detected event also may include an event that is associated with another application (e.g., a third-party application). For example, an event may occur based on a communication with another application or system. In one example, an application that manages organizational data 311 is integrated with one or more different third-party applications. As such, updates and information communicated via the respective integrations generally can be handled as events. For example, incoming updates based on or involving organizational data 311 received from third-party applications generally can be processed as events.

In an embodiment, a computer system (e.g., computing system 110, computing system 310, etc.) receives or otherwise detects an occurrence of an event. For example, an application associated with a system of record may receive and analyze the event to identify one or more triggers (e.g., the above-described trigger) to evaluate in association with the event. In one example, the application may analyze a source of the event, nature of the event, information associated with the event, organizational data 311 in the system of record, application policy data 313, integration data 314, data structures 315, application object data 316, and/or any other information that may be available to determine processing for the event. For example, the application may determine one or more triggers (e.g., the above-described trigger) to evaluate based on analyzing available information associated with the event. Also, the application may determine whether to evaluate conditions associated with such triggers based on analyzing available information associated with the event. In various examples, an application detects the occurrence of an event and identifies one or more triggers (e.g., the above-described trigger) to run based on the event, causing evaluation of the conditions associated with the respective identified triggers.

At 406, a computer system (e.g., computing system 110, computing system 310, etc.) evaluates one or more conditions associated with the above-described trigger. In an embodiment, the computer system evaluates one or more conditions of the trigger based on an occurrence of an event associated with an application. For example, a trigger may be run based on an event by initiating evaluation of one or more conditions associated with the trigger. In an example, the trigger may be an application object associated with corresponding application object data 316 where the trigger is enabled for use with an application that manages organizational data 311. The trigger also may be based on or otherwise expressed in a custom computer language for processing organizational data 311 where the custom computer language is supported by the application. As such, trigger conditions can be expressed as one or more custom computer language statements that are evaluated when a trigger is referenced based on an event.

In an embodiment, conditions of the above-described trigger may include one or more conditions that can be evaluated to determine a result. For example, a trigger condition may be expressed as a single expression (e.g., employee.current salary−employee.updated salary >$10,000), which in some examples may include one expression or any number of expressions that are connected or joined using logical operators including, but not limited to "and" and "or" operators. A trigger condition also may be expressed as a combination of multiple, separate expressions that each are evaluated individually and then in combination based on a result of each individual evaluation (e.g., employee.current salary−employee.updated salary >$10,000 and employee.department="engineering"). As an example, five separate conditions associated with a trigger may be evaluated individually to determine an overall result for the group of conditions. Conditions of a trigger also may be organized or grouped in any fashion. In various examples, trigger conditions can be based on any one or more of aspects of organizational data 311 or other information maintained by a system of record and/or based on any one or more aspects of organizational data 311 or other information associated with any application (e.g., any third-party application).

At 408, a computer system (e.g., computing system 110, computing system 310, etc.) determines whether the conditions of the above-described trigger are satisfied. In an embodiment, the computer system evaluates one or more conditions associated with a trigger to determine a result indicating whether the condition(s) associated with the trigger are satisfied (e.g., evaluates to true, evaluates to a value, meets a certain threshold, exceeds a certain threshold, etc.). For example, an application may evaluate conditions associated with a trigger in response to an event to determine whether to activate or "fire" the trigger by executing operations associated with the trigger.

In an embodiment, an application evaluates conditions associated with the above-described trigger, determines that the conditions of the trigger are satisfied, and causes activation of the trigger to execute operations configured for the trigger. In some examples, the application determines that at least one of the conditions of a trigger are not satisfied. In one example, activation of a trigger does not occur when at least one of the conditions of a trigger are not satisfied. As such, the application would not execute operations of the trigger because the trigger was not activated.

At 410, a computer system (e.g., computing system 110, computing system 310, etc.) executes one or more operations of the above-described trigger in a custom computer language when the conditions of the trigger are satisfied. In an embodiment, one or more operations are configured for execution of a trigger based on activation of the trigger. For example, an application that evaluates conditions of a trigger and determines that the conditions of the trigger are satisfied then may execute operations associated with the trigger based on activation or "firing" of the trigger. In various examples, operations associated with a trigger may be expressed in a custom computer language for processing organizational data 311 where the custom computer language is supported by the application.

In an embodiment, an application executes one or more operations of the above-described trigger. For example, the application may be associated with an organizational data management system that serves as a system of record for organizational data 311. Further, the operations of the trigger may be expressed in or otherwise based on a custom computer language supported by the application. In some examples, the application performs one or more updates to organizational data 311 based on executing one or more operations associated with the trigger. For example, the application may update one or more entities, attribute values, custom fields, formulas, and/or any other information associated with organizational data 311.

In an embodiment, the application performs one or more actions, for example in view of organizational data 311, based on executing one or more operations associated with the above-described trigger. For example, such actions may include, but are not limited to, advancing progression of a workflow, completing a workflow, assigning a task, updating status of a task, completing a task, initiating evaluation of another trigger, firing another trigger, approval of a request, denial of a request, generation of one or more alerts, transmission of one or more alerts, generation of one or more messages, transmission of one or more messages, and/or performing any other types of actions associated with the application.

In an embodiment, the application performs one or more actions involving one or more other applications (e.g., third-party applications), for example in view of organizational data 311, based on executing one or more operations associated with the above-described trigger. For example, the application may use integration data 314 to perform one or more operations that involve separate, third-party applications. The application also can initiate one or more updates to organizational data 311 stored, utilized, and/or otherwise associated with any one or more different third-party applications. Further, in various examples, an application may perform any of the noted actions and/or any other actions in any combination based on executing operations associated with the trigger.

Figure 5:
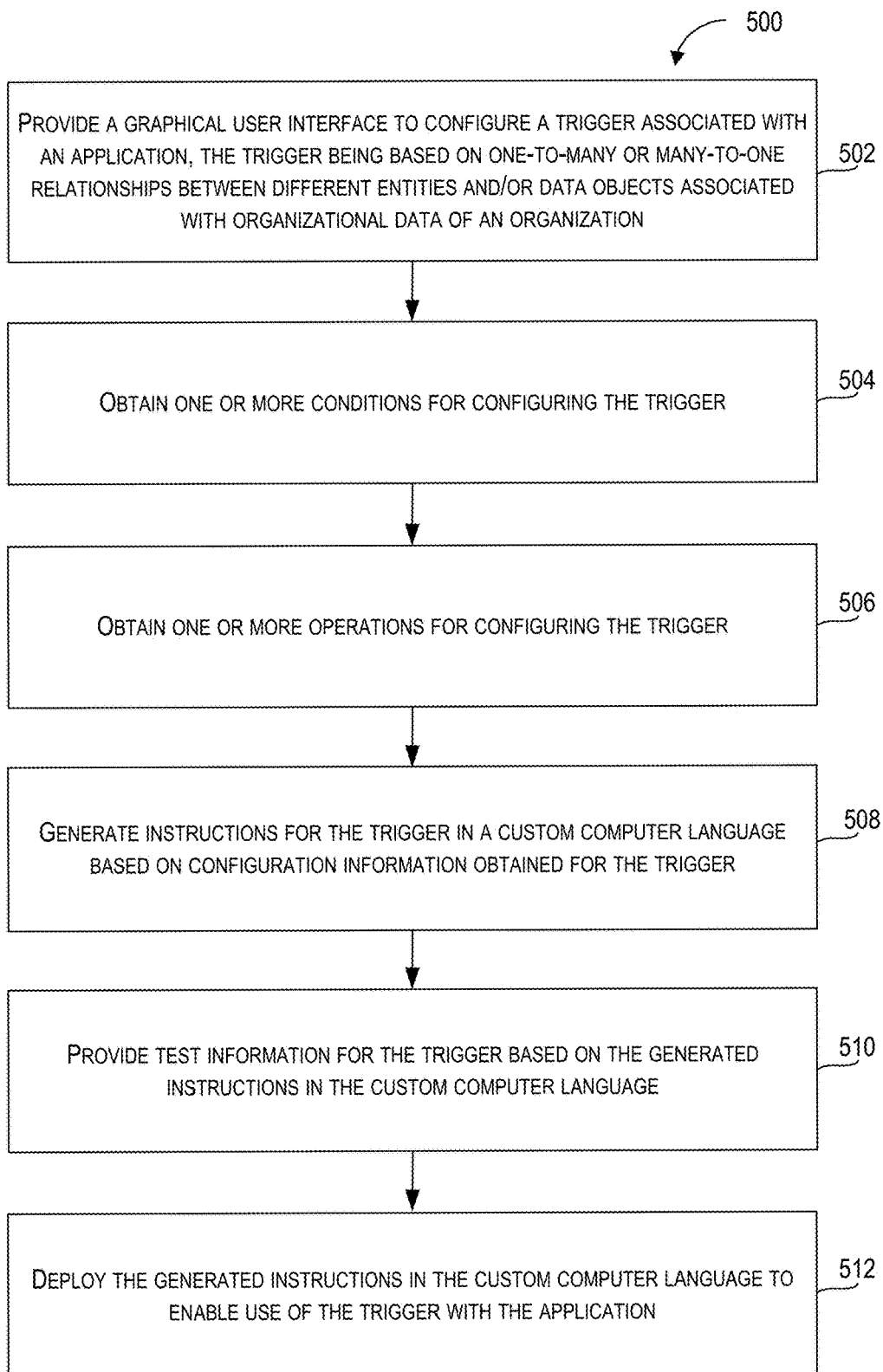
FIG. 5 depicts a flow diagram of an example method for providing configuration of triggers based on one-to-many or many-to-one relationships between different entities and/or data objects in a system of record that manages organizational data, according to example embodiments of the present disclosure.

FIG. 5 depicts a flow diagram of an example method 500 for providing configuration of triggers based on one-to-many or many-to-one relationships between different entities and/or data objects in a system of record that manages organizational data, according to example embodiments of the present disclosure. One or more portions of the method 500 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 500 can be executed or implemented as an algorithm on the hardware devices or systems disclosed herein. FIG. 5 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 502, a computer system (e.g., computing system 110, computing system 310, etc.) provides a graphical user interface to configure a trigger associated with an application, where the trigger can be based on one-to-many or many-to-one relationships between different entities and/or data objects associated with organizational data of an organization. In an embodiment, an application may provide one or more graphical user interfaces that enable authorized users to configure such triggers associated with the application based on one-to-many or many-to-one relationships between different entities and/or data objects associated with organizational data of an organization. For example, the one or more graphical user interfaces generally may allow a user to: create and configure a new trigger; modify configuration of an existing trigger; enable a trigger; disable a trigger; test a trigger; approve a trigger; deploy a trigger; execute a trigger; and/or perform any other actions that may be associated with such triggers provided by an application, where each of the triggers can be based on one-to-many or many-to-one relationships between different entities and/or data objects associated with organizational data of an organization.

As an example, FIG. 6 depicts an illustration of an example user interface 600 for configuring a trigger based on one-to-many or many-to-one relationships between different entities and/or data objects in a system of record, according to example embodiments of the present disclosure. The example user interface 600 generally allows a user to create and to configure an alert that is an automated workflow, where the alert includes one or more trigger events (e.g., one or more conditions) and one or more alert actions (e.g., one or more operations) that can be performed (e.g., automatically via the computer system) when the one or more alert actions are satisfied. For example, the example user interface 600 allows a user to provide one or more conditions or events (e.g., an initial condition and/or one or more optional filter conditions) that can initiate one or more alter actions (e.g., an alert, a workflow, a task, etc.) when such condition(s) or event(s) are satisfied. Such user interfaces generally may allow users to configure trigger conditions and operations based on, for instance: entity information (e.g., an employee entity); attribute information (e.g., attributes of an employee entity); one or more relationships between entities (e.g., a one-to-many relationship where an employee has multiple devices, a many-to-one relationship where multiple documents are associated with one employee, etc.); associated entity information (e.g., a device assigned to an employee); associated entity attribute information (e.g., a model of a device assigned to an employee, a version of software running on a device assigned to an employee, etc.); operations available from the system of record (e.g., ping a device assigned to an employee, install a particular application on a device assigned to an employee, install a patch for an operating system running on a device assigned to an employee, etc.); and/or entity information, attribute information, and operations available from one or more third-party applications integrated with the system of record.

Figure 7A:
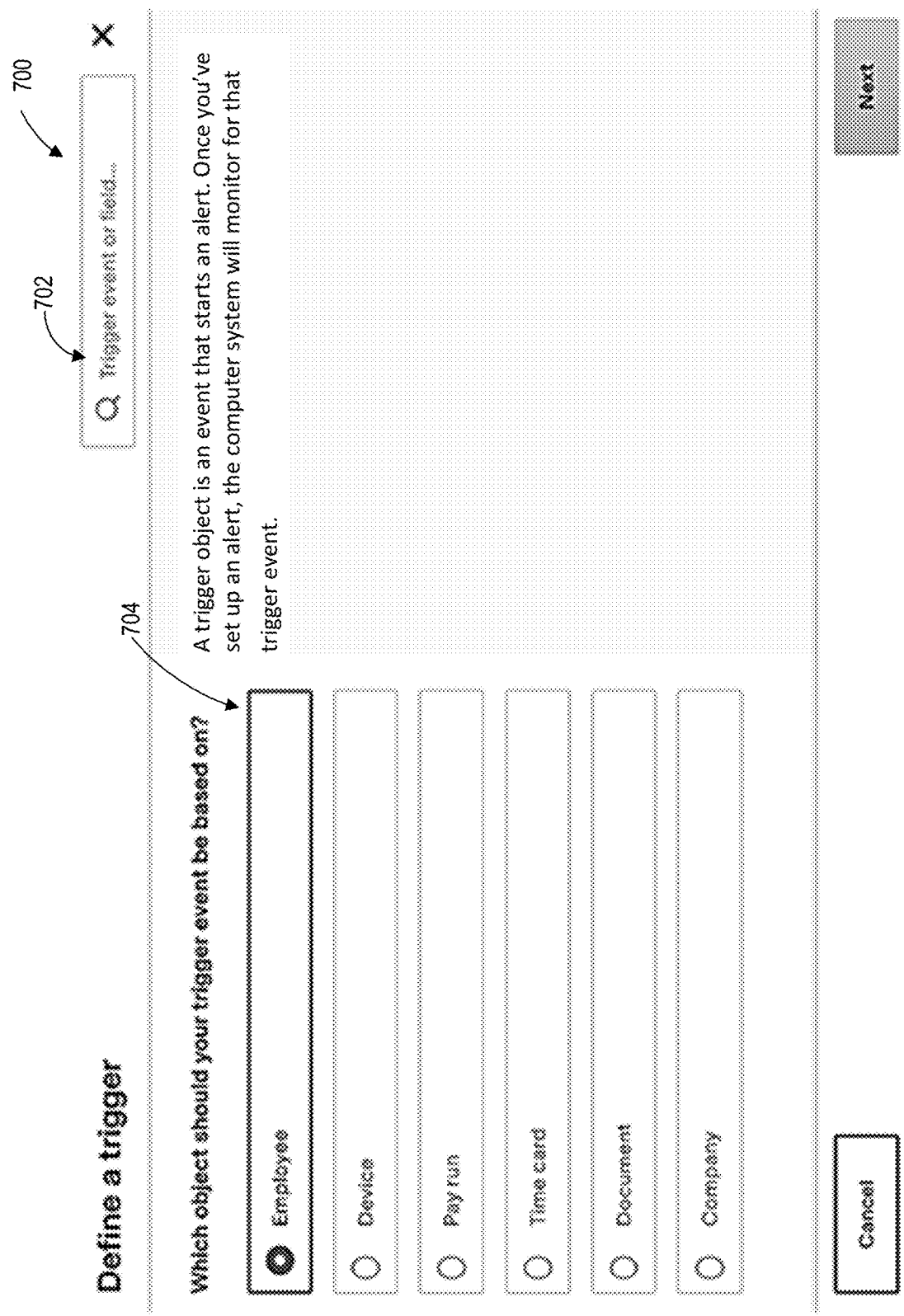
FIG. 7A depicts an illustration of an example user interface for selecting a trigger object when configuring a trigger based on one-to-many or many-to-one relationships between different entities and/or data objects in a system of record, according to example embodiments of the present disclosure.

As an example, FIG. 7A depicts an illustration of an example user interface 700 for selecting a trigger object when configuring a trigger based on one-to-many or many-to-one relationships between different entities and/or data objects in a system of record, according to example embodiments of the present disclosure. In example user interface 700, a search interface 702 is provided to enable a user to search for one or more of available trigger objects, available fields associated with trigger objects, available events associated with trigger objects, and/or any other type of information available from a system of record for configuring triggers. In some examples, the search interface 702 may provide access to preconfigured trigger templates that a user may utilize, for example, as a starting point when configuring a trigger. Such trigger templates and/or any other types of templates may be provided in addition to or as an alternative to the search interface 702. For example, trigger templates may be provided via a navigable user interface that may include an organized list of folders or other objects that enable multiple different users to define, redefine, use, reuse, and/or perform any other types of activities relating to trigger templates.

As illustrated in the example embodiment depicted in FIG. 7A, example user interface 700 also includes a listing of trigger objects 704 available for selection by a user, where such trigger objects 704 can include, but are not limited to, for instance: an employee trigger object, a device trigger object, a pay run trigger object, a time card trigger object, a document trigger object, a company trigger object, and/or another trigger object. For example, a listing of trigger objects 704 may be generated based on one or more types of entities utilized by a system. In one example, a listing of trigger objects 704 is generated based on identifying (e.g., by computing system 110, computing system 310, etc.) one or more types of entities maintained by a system of record. For example, one or more entities available for trigger configuration may be determined and presented based on analyzing (e.g., by computing system 110, computing system 310, etc.) one or more data structures 315 associated with a system of record (e.g., where a type of one or more nodes of data structures 315 can correspond to and/or constitute a type of entity that can be selected by a user as a trigger object). In addition, information provided to a user may be based on one or more: organizational subscriptions with third-party applications; configured integrations with third-party applications; permissions of a user; custom entities configured for an organization; custom fields configured for an organization; and/or another aspect.

Figure 7B:
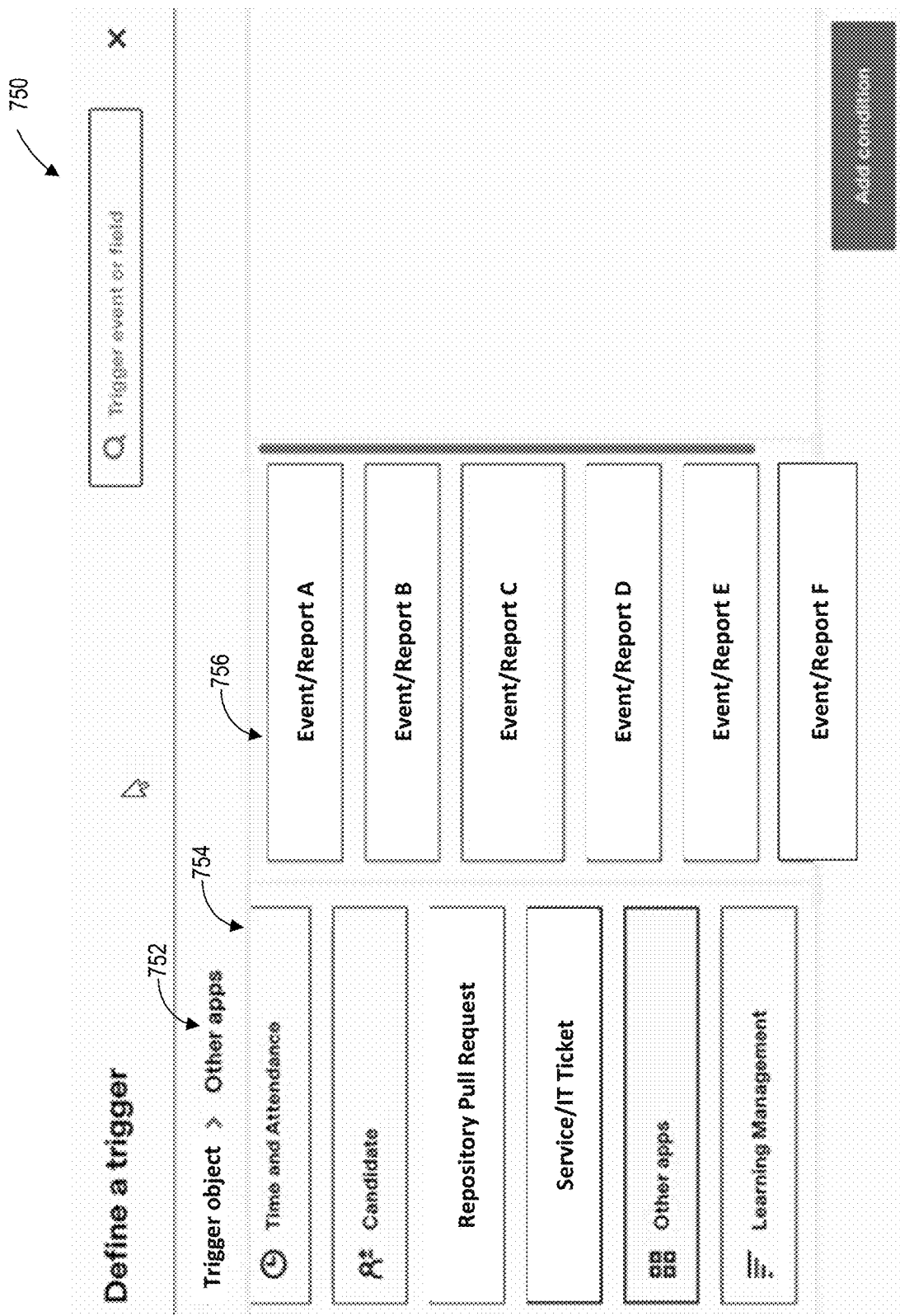
FIG. 7B depicts an illustration of an example user interface that includes options for selecting a trigger object associated with a third-party application when configuring a trigger based on one-to-many or many-to-one relationships between different entities and/or data objects in a system of record, according to example embodiments of the present disclosure.

As an example, FIG. 7B depicts an illustration of an example user interface 750 that includes options for selecting a trigger object associated with a third-party application when configuring a trigger based on one-to-many or many-to-one relationships between different entities and/or data objects in a system of record, according to example embodiments of the present disclosure. In example user interface 750, information and events associated with applications other than a system of record (i.e., other apps 752) may be used to configure such a trigger. Example user interface 750 includes multiple third-party applications in an example listing of objects 754, which may be used in configuring such a trigger. Example user interface 750 also includes an example listing of third-party events and reports 756, which may be used in configuring such a trigger. The example third-party applications listed in example user interface 750 are only for illustration purposes, and information from any type of third-party application integrated with or otherwise available to a system of record may be utilized to configure triggers.

At 504, a computer system (e.g., computing system 110, computing system 310, etc.) obtains one or more conditions for configuring the above-described trigger. In an embodiment, the computer system receives one or more conditions from a user for configuring a trigger. For example, a user may provide information indicating one or more conditions for a trigger in a computer language, in a custom computer language, and/or via one or more graphical user interfaces. In an example, conditions for a trigger may be stored as and/or obtained from application object data 316 and/or other data. In addition, trigger conditions may be expressed in a custom computer language for managing organizational data 311.

Figure 8A:
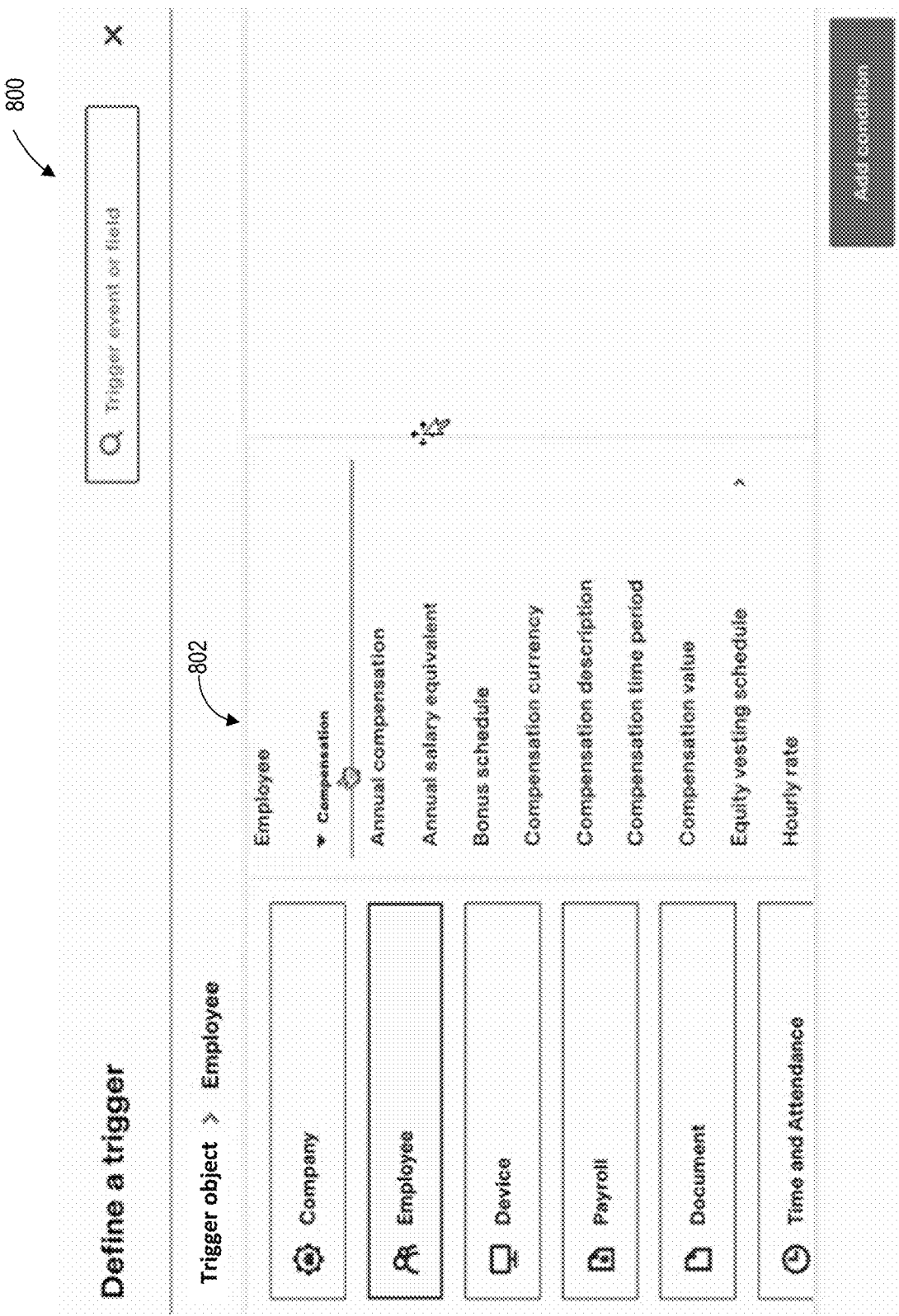
FIG. 8A depicts an illustration of an example user interface for defining a condition for a trigger object when configuring a trigger based on one-to-many or many-to-one relationships between different entities and/or data objects in a system of record, according to example embodiments of the present disclosure.

As an example, FIG. 8A depicts an illustration of an example user interface 800 for defining a condition for a trigger object when configuring a trigger based on one-to-many or many-to-one relationships between different entities and/or data objects in a system of record, according to example embodiments of the present disclosure. In example user interface 800, a user has started to define a trigger object based on an employee entity associated with a system of record for managing organizational data 311. In the example user interface 800, the user is presented with an additional interface 802 that allows the user to select a category of attributes associated with an entity (e.g., a category of compensation-related attributes of an employee entity associated with the system of record). The additional interface 802 also provides a listing of selectable fields associated with the current category of attributes in the additional interface 802 (e.g., the listing of specific employee entity attributes in the compensation category). In various examples, one or more categories and/or attributes related to an entity may be determined based on analyzing (e.g., by computing system 110, computing system 310, etc.) one or more data structures 315 associated with a system of record (e.g., where attributes of one or more nodes or data objects of data structures 315 can correspond to and/or constitute attributes of entity that can be selected by a user).

Figure 8B:
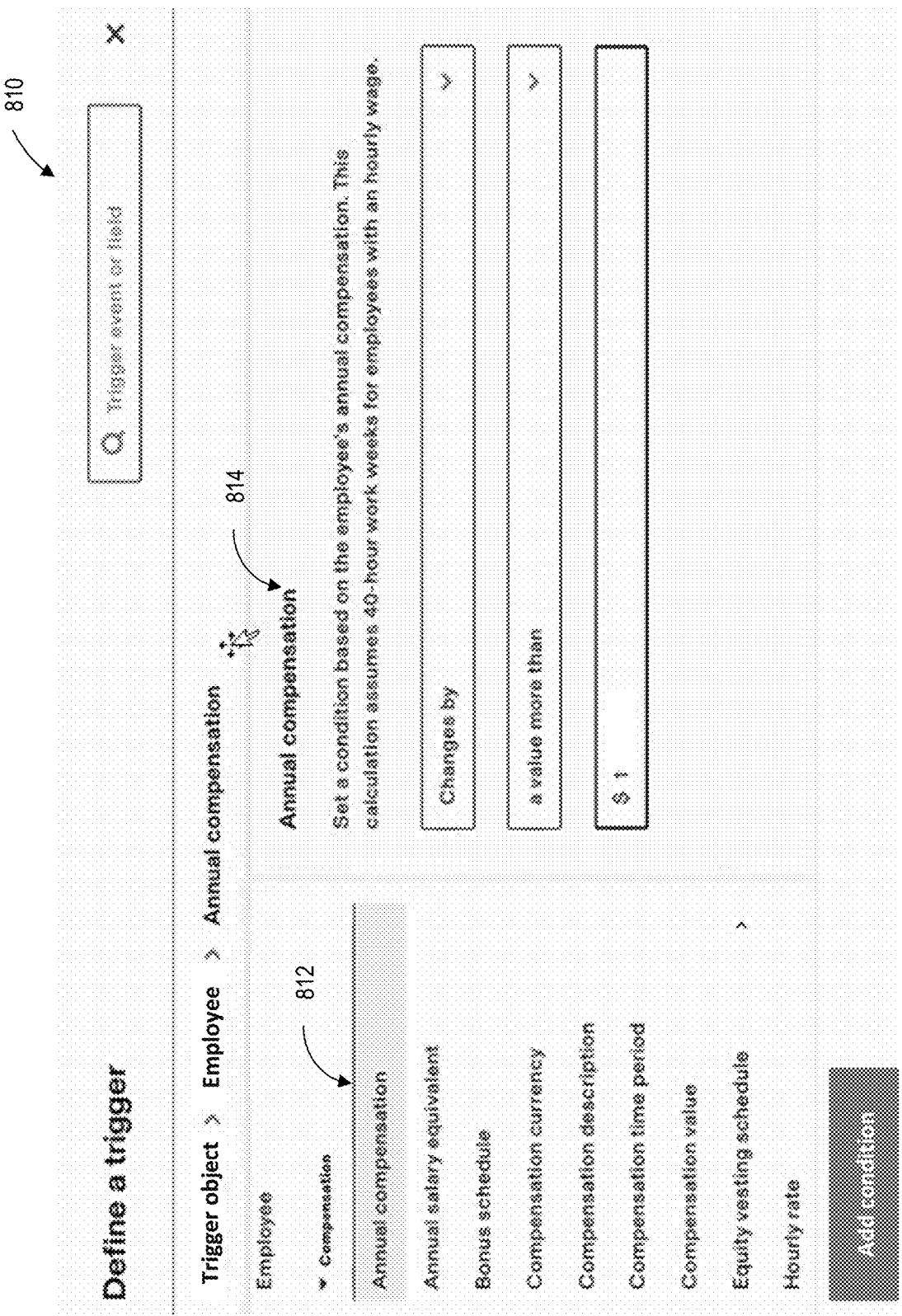
FIG. 8B depicts an illustration of an example user interface for defining a condition for a trigger object when configuring a trigger based on one-to-many or many-to-one relationships between different entities and/or data objects in a system of record, according to example embodiments of the present disclosure.

FIG. 8B depicts an illustration of an example user interface 810 for defining a condition for a trigger object when configuring a trigger based on one-to-many or many-to-one relationships between different entities and/or data objects in a system of record, according to example embodiments of the present disclosure. Continuing with the example above from FIG. 8A above, example user interface 810 shows a user selection of the annual compensation attribute 812 of the employee entity. In addition, the user is provided with an additional user interface 814 that enables the user to configure a condition based on annual compensation of the employee entity. The user then may adjust any one or more of the various options presented by the additional user interface 814 and add the desired condition to the trigger. Further, the user may continue one or more additional conditions associated with the employee entity, one or more entities associated with the employee entity (e.g., devices, applications, etc.), one or more third-party applications, and/or any other entities supported by a system of record. Once the user has finished adding conditions for the trigger, then the user can configure one or more operations for the trigger. Additional illustrations of example user interfaces that enable configuration of trigger conditions are illustrated in FIGS. 8C-8F.

Figure 8C:
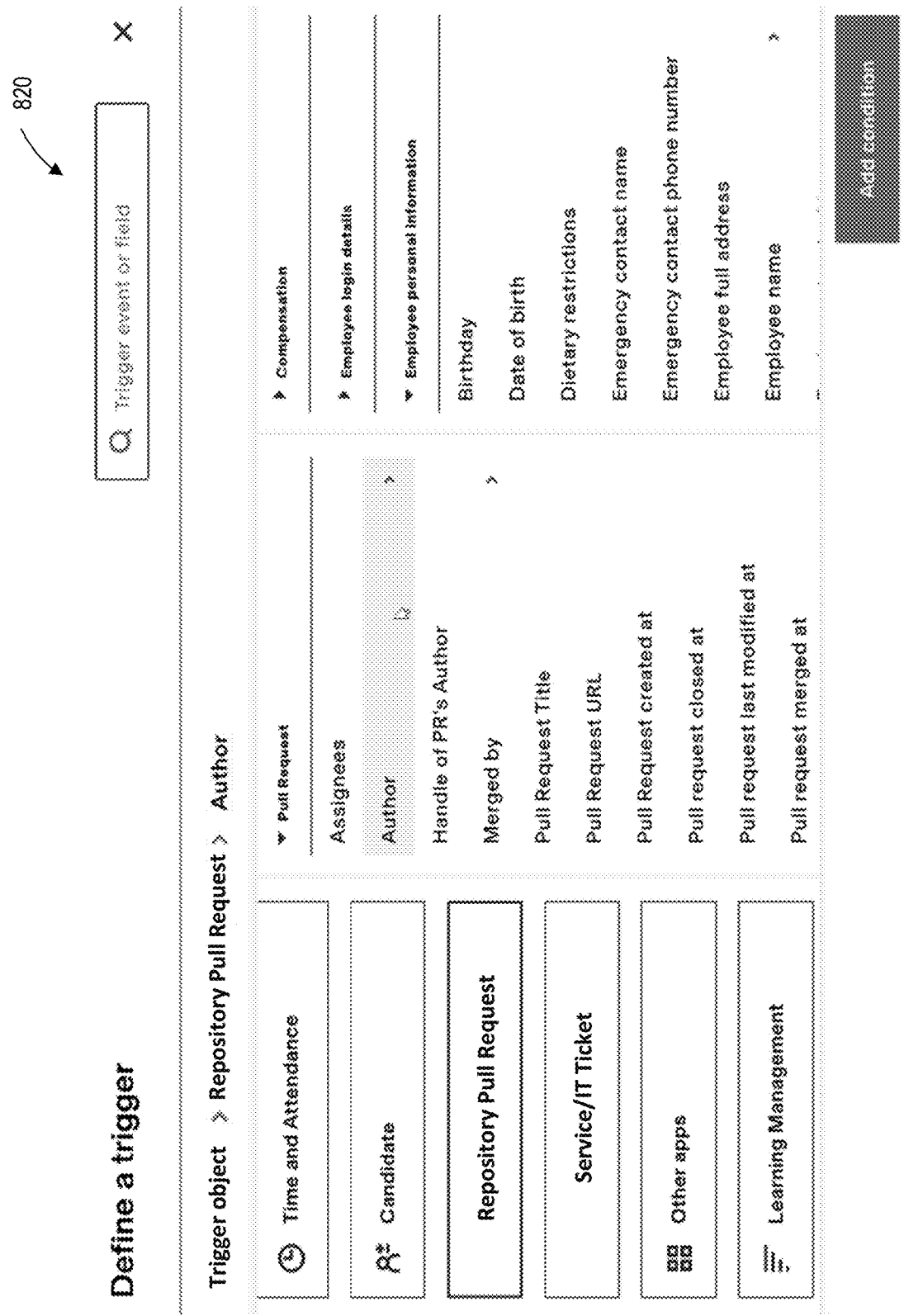
FIG. 8C depicts an illustration of an example user interface for defining a condition for a trigger object based on a third-party application integration with a system of record, according to example embodiments of the present disclosure.

FIG. 8C depicts an illustration of an example user interface 820 for defining a condition for a trigger object based on a third-party application integration with a system of record, according to example embodiments of the present disclosure. In an example, a user can select an attribute associated with a third-party source code repository application and then define criteria for a trigger condition based on the selected attribute.

Figure 8D:
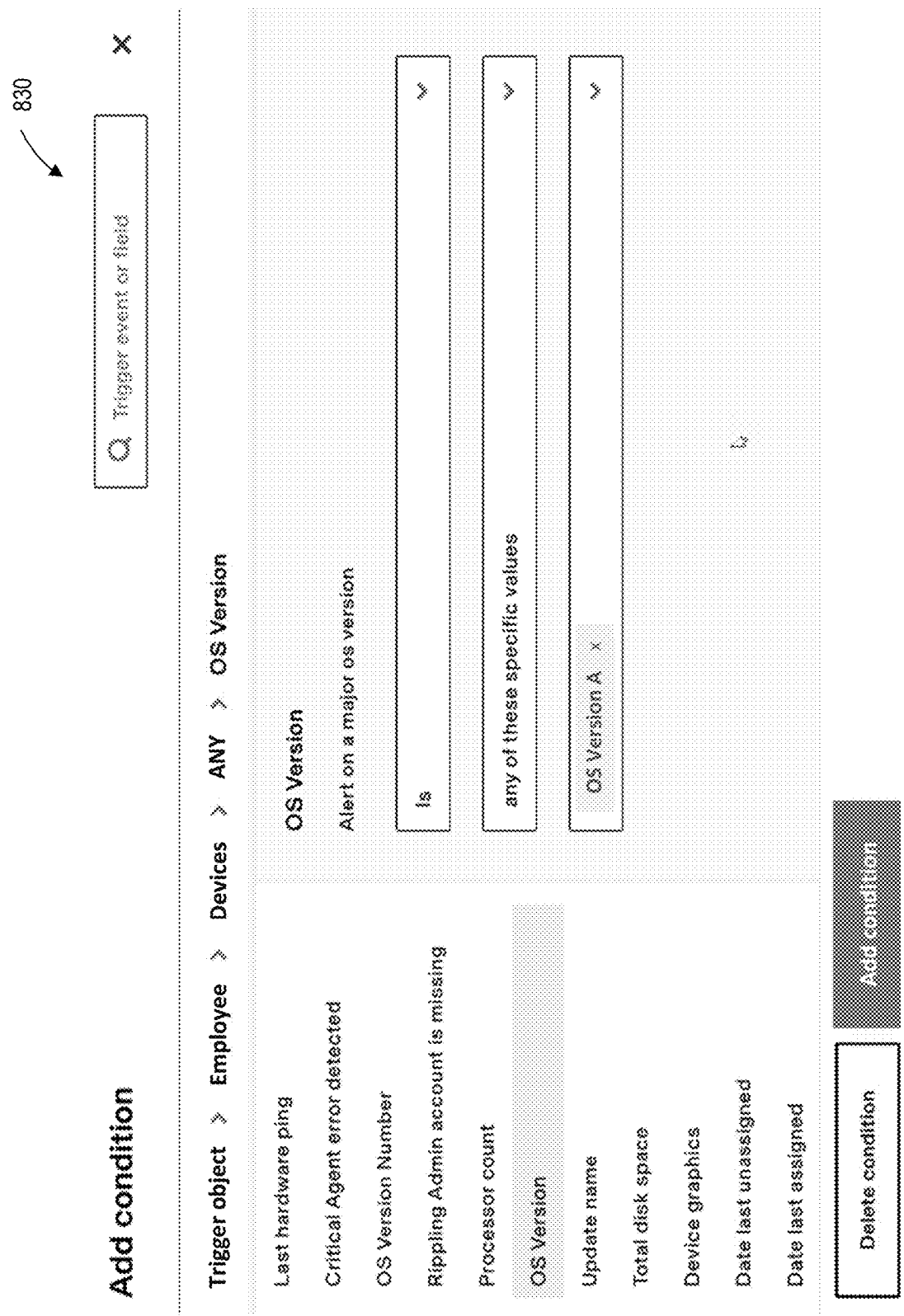
FIG. 8D depicts an illustration of an example user interface for defining a condition for a trigger object across multiple entities based on a relationship between the entities in a system of record, according to example embodiments of the present disclosure.

FIG. 8D depicts an illustration of an example user interface 830 for defining a condition for a trigger object across multiple entities based on a relationship between the entities in a system of record, according to example embodiments of the present disclosure. In an example, a user can define a condition based on an association or relationship between two or more entities (e.g., a one-to-many relationship between the entities). As one example, a condition may be based on an attribute of particular types of devices that are assigned to employees where any employee may have any number of devices.

Figure 8E:
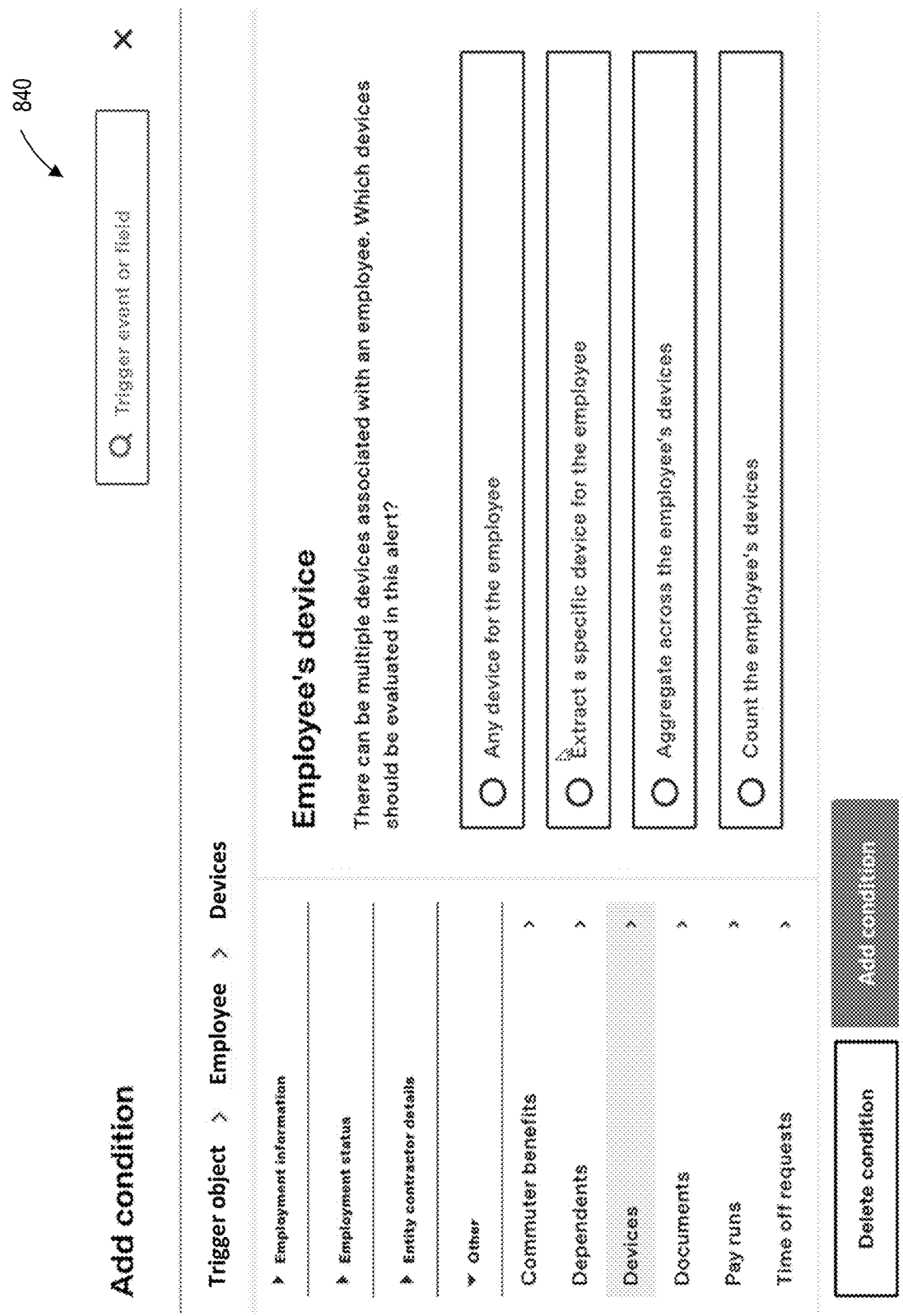
FIG. 8E depicts an illustration of an example user interface for selecting an object that results in a one-to-many relationship associated with entities in a system of record, according to example embodiments of the present disclosure.

FIG. 8E depicts an illustration of an example user interface 840 for selecting an object that results in a one-to-many relationship associated with entities in a system of record, according to example embodiments of the present disclosure. In the example embodiment depicted in FIG. 8E, example user interface 840 allows a user to specify which object (e.g., data object) they want to apply the condition. For instance, in this example embodiment, example user interface 840 allows a user to select "any object" (denoted in FIG. 8E as "Any device for the employee"), "extract an object based on a criterion" (denoted in FIG. 8E as "Extract a specific device for the employee"), "aggregate across objects" (denoted in FIG. 8E as "Aggregate across the employee's devices"), or "count the number of objects" (denoted in FIG. 8E as "Count the employee's devices"). In at least one example embodiment, example user interface 840 allows a user to define a condition for activation of a trigger based on a one-to-many relationship between a first entity and/or data object and multiple second entities and/or data objects of the above-described organizational data 203 and/or organizational data 311, where the user can define such a one-to-many relationship via example user interface 840.

In one or more embodiments, to facilitate association of the condition with such a one-to-many relationship that can be defined by the user via example user interface 840, computing system 110 and/or computing system 310 can utilize a one-to-many operator that corresponds to the selection made by the user via example user interface 840. For example, computing system 110 and/or computing system 310 can utilize a one-to-many operator such as, for instance, the "ANY" operator, the "EXTRACT" operator, the "AGGREGATE" operator, the "COUNT" operator, the "MOST RECENTLY USED" operator, or the "MOST RECENTLY ASSIGNED" operator described above with reference to the example embodiment depicted in FIG. 1. That is, for example, in one or more embodiments, to facilitate association of the condition with such a one-to-many relationship that can be defined by the user via example user interface 840, computing system 110 and/or computing system 310 can utilize: the "ANY" operator if the user selects "Any device for the employee" from example user interface 840; the "EXTRACT" operator if the user selects "Extract a specific device for the employee" from example user interface 840; the "AGGREGATE" operator if the user selects "Aggregate across the employee's devices" from example user interface 840; or the "COUNT" operator if the user selects "Count the employee's devices" from example user interface 840.

In one embodiment, example user interface 840 allows a user to define a condition for a trigger object based on cardinality associated with entities in a system of record, according to example embodiments of the present disclosure. In this embodiment, condition selection options may be based on cardinality of a relationship between two or more entities (e.g., based on a one-to-many relationship between the entities). For example, where an employee can have any number of devices, example user interface 840 provides various selections that allow a user to define a condition based on various possible scenarios and/or various possible one-to-many relationships that can exist between the employee and the devices.

Figure 8F:
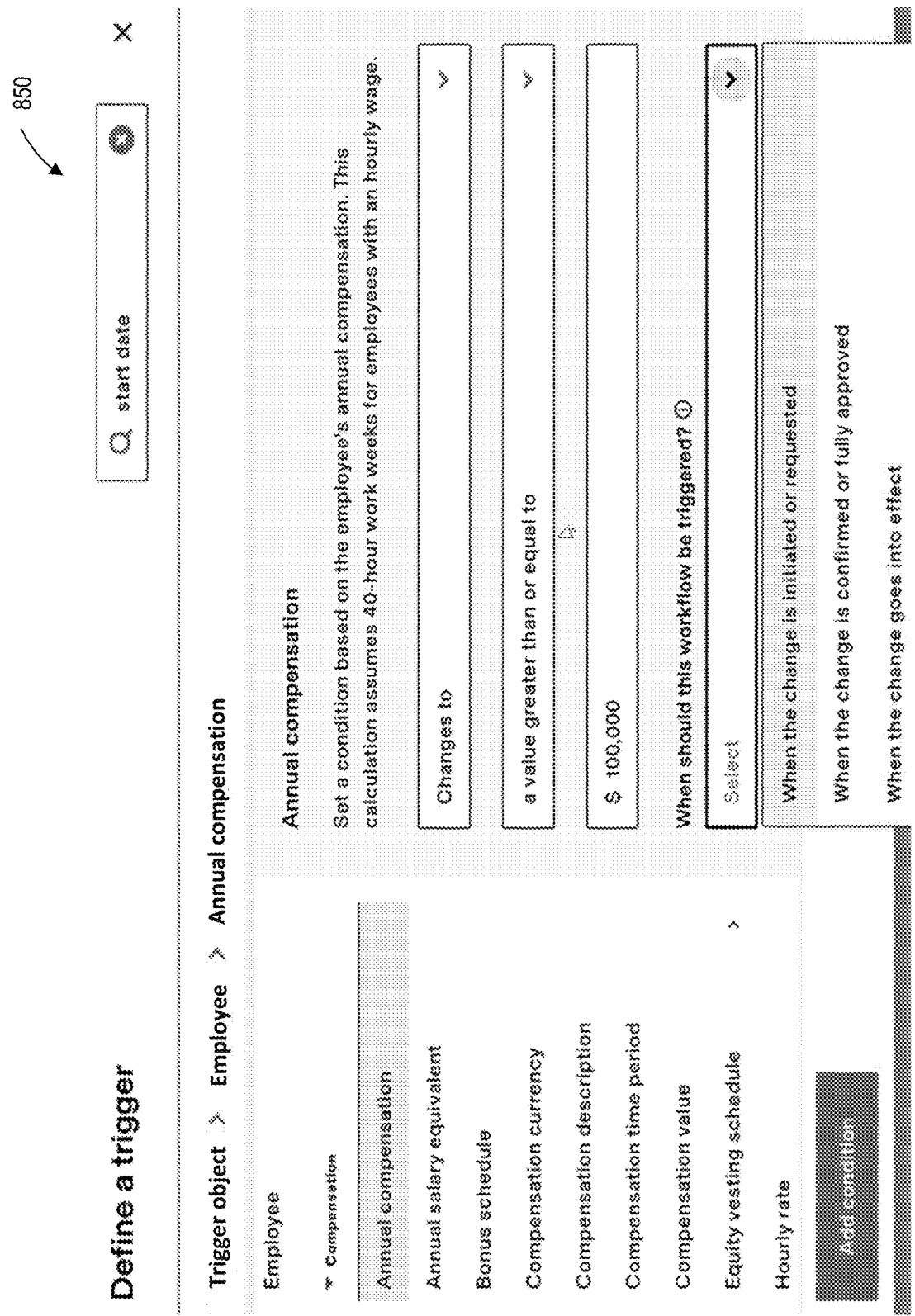
FIG. 8F depicts an illustration of an example user interface for defining a condition for triggering of an alert action associated with a system of record, according to example embodiments of the present disclosure.

FIG. 8F depicts an illustration of an example user interface 850 for defining a condition for triggering of an alert action (e.g., a workflow) associated with a system of record, according to example embodiments of the present disclosure. As an example, example user interface 850 allows a user to define when an alert action (e.g., a workflow) is triggered. For example, the alert action (e.g., workflow) can be configured to be triggered when a change is initiated or requested, when a change is confirmed or fully approved, or when a change goes into effect.

Figure 8G:
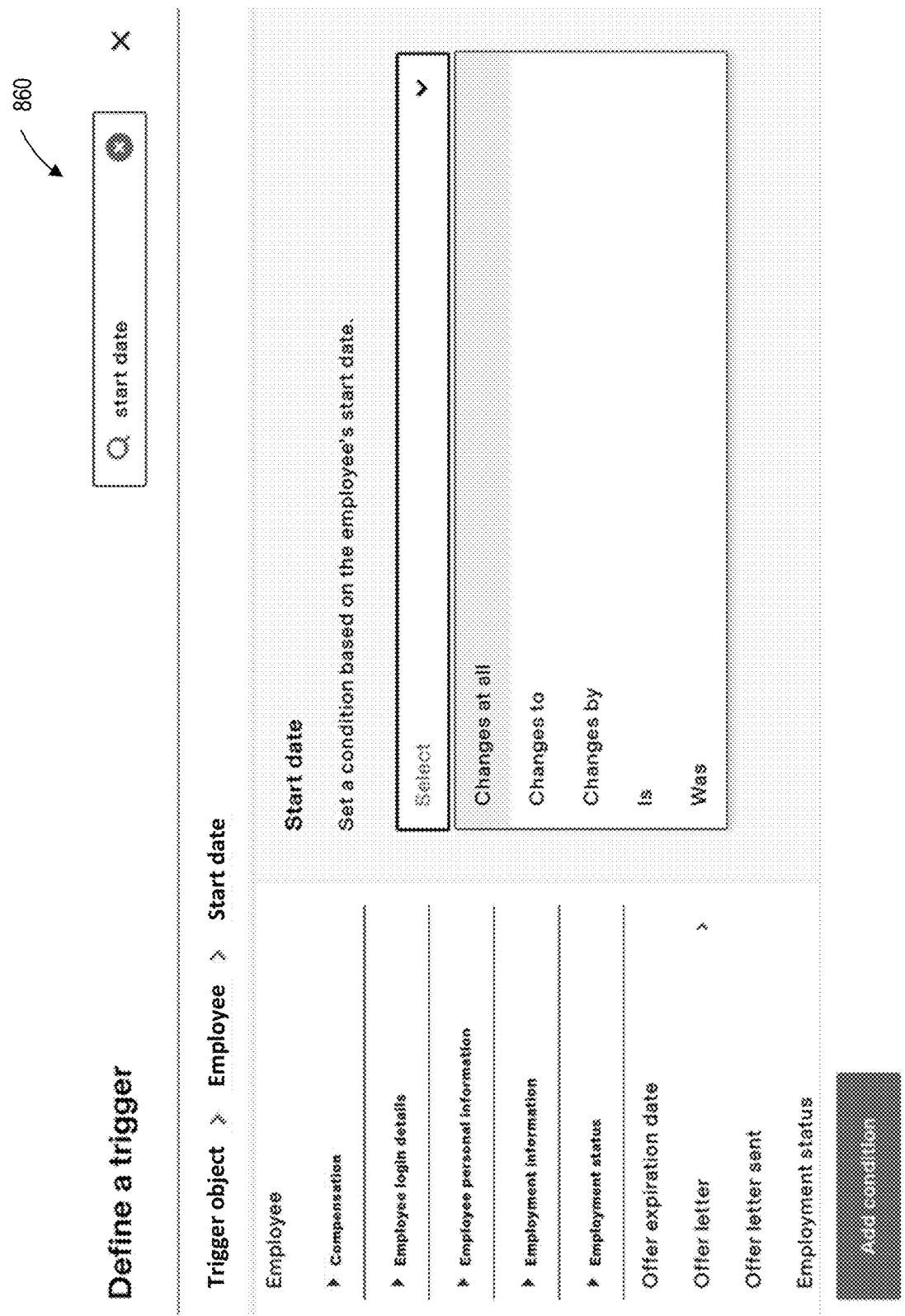
FIG. 8G depicts an illustration of an example user interface for selecting an operator from a set of operators when defining a condition for a trigger object associated with a system of record, according to example embodiments of the present disclosure.

FIG. 8G depicts an illustration of an example user interface 860 for selecting an operator from a set of operators when defining a condition for a trigger object associated with a system of record, according to example embodiments of the present disclosure. For example, a user may be provided with a list of operators to facilitate configuration of a condition.

Figure 8H:
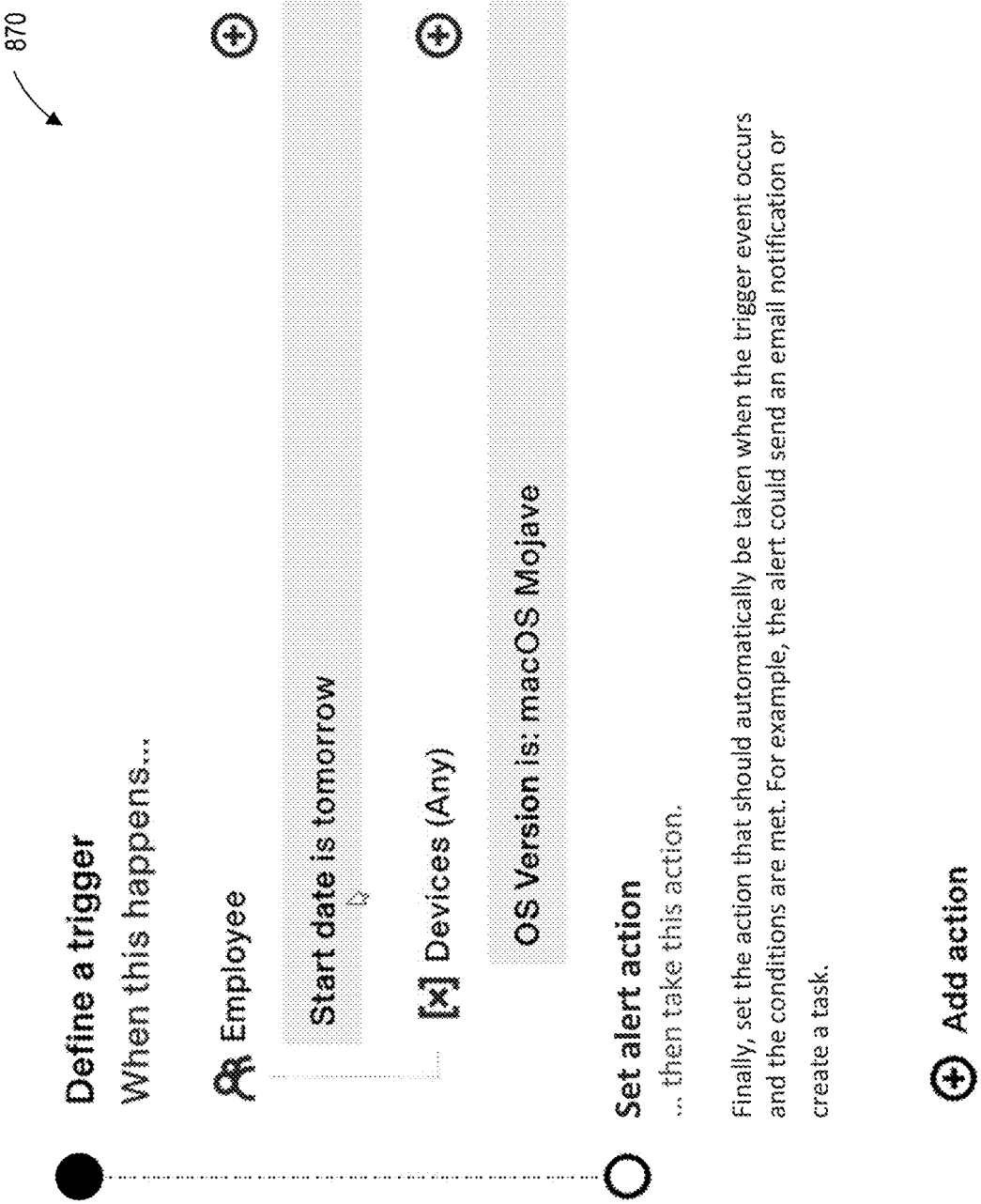
FIG. 8H depicts an illustration of an example user interface depicting a layered configuration of conditions for a trigger object associated with a system of record, according to example embodiments of the present disclosure.

FIG. 8H depicts an illustration of an example user interface 870 depicting a layered configuration of conditions for a trigger object associated with a system of record, according to example embodiments of the present disclosure. For example, example user interface includes two layers of conditions with the first layer that evaluates whether an employee start date is "tomorrow" and a second layer that evaluates whether any devices of such an employee is a particular operating system version.

At 506, a computer system (e.g., computing system 110, computing system 310, etc.) obtains one or more operations for configuring the trigger. In an embodiment, a user may provide information indicating one or more operations for a trigger in a computer language, in a custom computer language, and/or via one or more graphical user interfaces. In an example, operations for a trigger may be stored as and/or obtained from application object data 316 and/or other data. In addition, trigger operations may be expressed in a custom computer language for managing organizational data 311.

In an embodiment, an application provides one or more graphical user interfaces that enable authorized users to configure one or more operations for triggers associated with the application. For example, a user interface provided by an application may include one or more of lists of one or more entities from a system of record, one or more operations from entities from a system of record, one or more third-party applications integrated with a system of record, one or more operations associated with respective third-party applications integrated with a system of record, and/or any other available information to enable a user to configure operations for a trigger. In an example, the user interfaces and associated information provided for configuring operations for a trigger may be determined based on analyzing (e.g., by computing system 110, computing system 310, etc.) one or more data structures 315 associated with a system of record.

In an embodiment, one or more operations for a trigger are executed when conditions of the trigger are satisfied. For example, one or more operations associated with the application trigger may cause an application or system to perform one or more operations internally, may cause the application or system to perform one or more operations in association with an external application or system (e.g., based on an integration, etc.), or may cause the application or system to perform one or more operations both internally and with an external application or system. In one example, the one or more operations may include performing any operation available in a system of record, any operation available from an application provided for use with the system of record, and/or any operation available from a third-party application integrated with the system of record. Some examples of operations may include, but are not limited to, for instance: updating organizational data 311; advancing progression of a workflow; completing a workflow; assigning a task; updating status of a task; completing a task; initiating evaluation of another trigger; firing another trigger; approval of a request; denial of a request; generation of one or more alerts; transmission of one or more alerts; generation of one or more messages; transmission of one or more messages; generating and sending a request to another application; initiating an action or event in another application; installing an application on a user device; applying a software update to a user device; setting one or more configurations on a user device; setting one or more configurations for each of one or more applications provided to a user; setting one or more configurations for each of one or more applications on a user device; and/or performing any other types of actions within a system of record and/or across any number of applications. In some examples, a trigger may be configured with no condition, whereby one or more operations associated with the trigger are executed (e.g., the trigger is automatically activated or "fires") when the trigger is referenced or otherwise run without evaluation of any condition (e.g., when no condition exists for the trigger).

At 508, a computer system (e.g., computing system 110, computing system 310, etc.) generates instructions for the trigger in a custom computer language based on configuration information obtained for the trigger. In an embodiment, the computer system generates instructions in a custom computer language for use with an organizational data management system based on analyzing the configuration information associated with the trigger. For example, such configuration may include information associated with conditions for the trigger, conditions associated with operations of the trigger, and/or any other information associated with the trigger to generate instructions in a custom computer language.

In an embodiment, the instructions for a trigger may be generated (e.g., via a computer instruction generator of a custom language processing engine 318) based on one or more of organizational data 311, application policy data 313, integration data 314, data structures 315, application object data 316, and/or any other available information. In various examples, an application associated with a system of record can use the instructions generated for the trigger in the custom computer language to perform testing of the trigger in association with the system of record, to enable use of the trigger in association with the system of record, and/or to otherwise access and utilize the trigger in association with the system of record. In some examples, the instructions generated in the custom computer language can be provided to any user (e.g., via an application development environment 305, cloud application development environment 309, cloud development environment 317, etc.) for review, editing, approval, and/or any other purpose.

At 510, a computer system (e.g., computing system 110, computing system 310, etc.) provides test information for the trigger based on the generated instructions in the custom computer language. In an embodiment, the computer system performs one or more tests associated with a trigger. For example, the computer system may perform diagnostic testing of a trigger automatically and/or based on a user request. Such testing may be performed, for example, based on executing or simulating the execution of instructions generated for the trigger in a custom computer language, for example, based on organizational data 311.

In an embodiment, the computer system provides information obtained from performing testing of a trigger to a user for review, action, and/or another purpose. In some examples, the computer system provides a user with information based on one or more tests performed on a trigger. For example, the resulting information may be provided for all testing results or some testing results such as testing results that indicate a determination of possible or actual undesirable performance of a trigger. As such, in some examples, testing results of testing performed on triggers generally can be provided to warn or prevent users from configuring a trigger in an incorrect way or in a way that may have unintended consequences that can adversely impact organizational data 311 and/or performance of an organizational data management system.

In an embodiment, testing may be performed to provide a user with an example sample or set of organizational data 311 based on execution of a trigger. For example, such samples or sets of organizational data 311 may be generated or obtained based on simulating execution of a trigger or executing the trigger in association with some type of testing, staging, or temporary environment that does not affect organizational data 311 in a production system.

In an embodiment, an application associated with an organizational data management system performs testing on one or more triggers. For example, the testing performed on any trigger may include, but is not limited to: determining or estimating how frequently the trigger will run; determining or estimating how frequently the trigger will be activated when run; determining or estimating whether the trigger is recursive; determining or estimating how many levels of triggers are referenced based on activation of the trigger; determining or estimating how many organizational data 311 records will be updated based on activation of the trigger; and/or any other information that may be determined or estimated based on performing testing of any trigger. In various examples, such information may be provided to a user to allow the user to review the information and adjust trigger configuration based on the information. In some examples, an organizational data management system may suggest one or more adjustments to a trigger configuration based on a result of one or more tests. For example, such suggestions may be provided for a user to review, consider, modify, approve, deny, override, and/or another purpose.

In an embodiment, an application associated with an organizational data management system may provide one or more user interfaces that enable a user to perform testing of any one or more conditions and/or operations associated with a trigger. For example, an application may provide a test mode user interface that allows a user to test one or more aspects of a trigger configuration in whole or in part. For example, the user interface may generate an example of a message based on dynamic variables associated with organizational data 311 to allow a user to view an example of message content before the trigger is activated and any associated message is sent. The user interface also may enable a user to generate one or more test actions based on operations associated with a trigger. For example, the test actions may enable a user to send a test message or communication to a third-party application (e.g., as configured for a trigger) to confirm that the operation works as intended before deploying and enabling the trigger in a system of record. In an example, the test actions may be based on any integration between an organizational data management system and a third-party application in view of associated integration data 314. In one example, test actions may be used to enable a user to construct, view, and provide a test message to a third-party application via an API, webhook, and/or any other type of integration.

In an embodiment, an application associated with an organizational data management system maintains a dashboard of trigger information comprising trigger diagnostics for one or more users to view. For example, the trigger diagnostics may include, but are not limited to graphical and/or textual information that describes information about triggers that exist in a system, triggers that have been enabled for use in a system, a history of trigger execution that has occurred in a system (e.g., which can be queried or filtered based on any time period and/or other criteria), frequency of trigger execution that has occurred in a system, scheduled or forthcoming trigger execution in a system, and/or any other information associated with the execution of triggers in a system. Further, such information may be queried, filtered, presented, and/or otherwise provided in any one or more ways.

At 512, a computer system (e.g., computing system 110, computing system 310, etc.) deploys the generated instructions in the custom computer language to enable use of the trigger with the application. In an embodiment, the computer system deploys instructions generated for a trigger in the custom computer language to provide the trigger for use with an application associated with an organizational data management system. For example, a trigger may be deployed to the organizational data management system to enable use of the trigger with the organizational data management system. In some examples, a trigger may be deployed without enabling use of the trigger. For example, the trigger may be deployed to an organizational data management system and then may be enabled by a user that configured the trigger, by another user, by a system process, or in any other way that a trigger can be enabled in an application or system. Further, in various examples, any trigger generally may be enabled or disabled at any time.

Figure 9:
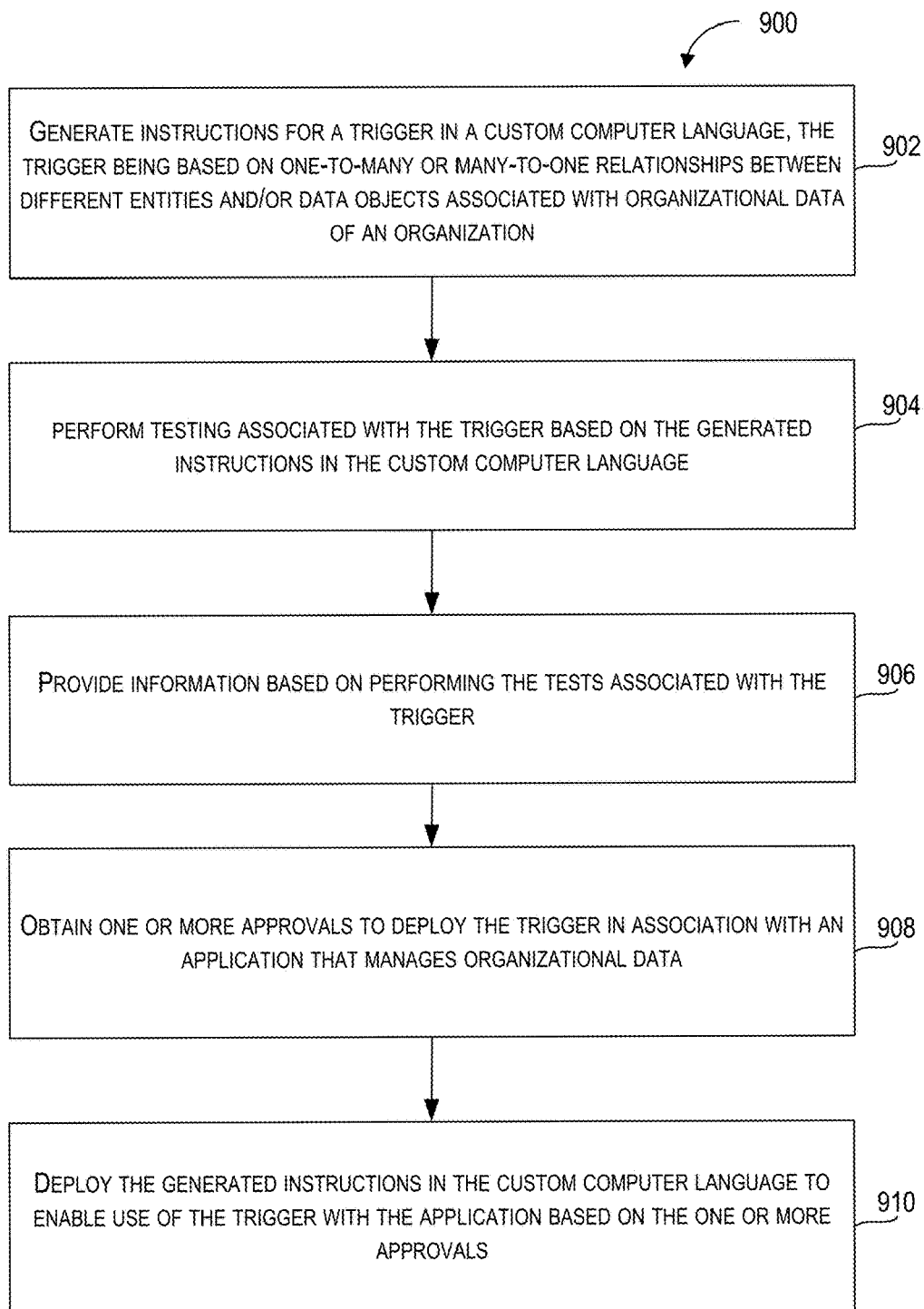
FIG. 9 depicts a flow diagram of an example method for providing trigger configuration diagnostics and approvals for a trigger that is configured based on one-to-many or many-to-one relationships between different entities and/or data objects in a system of record that manages organizational data, according to example embodiments of the present disclosure.

FIG. 9 depicts a flow diagram of an example method 900 for providing trigger configuration diagnostics and approvals for a trigger that is configured based on one-to-many or many-to-one relationships between different entities and/or data objects in a system of record that manages organizational data, according to example embodiments of the present disclosure. One or more portions of the method 900 can be executed and/or implemented on one or more computing devices or computing systems including, for example, the computing system 110, the remote computing system 130, the one or more computing devices 152, the computing device 200, the computing system 302, the computing system 306, and/or the computing system 310. In addition, one or more portions of the method 900 can be executed or implemented as an algorithm on the hardware devices or systems disclosed herein. FIG. 9 depicts steps performed in a particular order for purposes of illustration and discussion. As such, those of ordinary skill in the art, using the disclosures provided herein, will understand that various steps of any of the methods disclosed herein can be adapted, modified, rearranged, omitted, and/or expanded without deviating from the scope of the present disclosure.

At 902, a computer system (e.g., computing system 110, computing system 310, etc.) generates instructions for a trigger in a custom computer language, where the trigger can be based on one-to-many or many-to-one relationships between different entities and/or data objects associated with organizational data of an organization. In an embodiment, the computer system receives configuration information for the trigger. For example, such configuration information may include information about one or more conditions and/or one or more operations configured for the trigger. In an example, the computer system generates instructions for the trigger in a computer language. For example, the instructions may be generated in a custom computer language to enable use of the configured trigger with a system that supports the custom computer language. In one example, instructions are generated in a custom computer language provided by an organizational data management system that manages organizational data 311.

At 904, a computer system (e.g., computing system 110, computing system 310, etc.) performs testing associated with the trigger based on the generated instructions in the custom computer language. In an embodiment, the computer system performs one or more automated tests associated with the trigger. For example, some tests may be determined and performed based on a trigger type, based on organizational data 311 used by the trigger, based on organizational data 311 modified by the trigger, based on a third-party application associated with the trigger, and/or based on any particular scenario that may require specialized testing based on configuration of certain triggers. In some examples, one or more tests may be performed on a variety of triggers, a variety of trigger configurations, an entire set of triggers, etc. Users also may initiate or perform one or more tests associated with the trigger. For example, a computer system (e.g., computing system 110, computing system 310, etc.) may provide one or more user interfaces including, but not limited to, a dashboard that allows testing of triggers, a trigger simulation environment, a test harness, an automated test framework, and/or any other type(s) of user interfaces or tools that facilitate the testing of triggers by users.

At 906, a computer system (e.g., computing system 110, computing system 310, etc.) provides information based on performing the testing associated with the trigger. In an embodiment, the computer system collects information obtained from performing testing of a trigger and presents associated information to a user. Examples of trigger testing information provided to a user may include, but are not limited to, for instance: frequency of trigger execution; detection of circular triggers; count and identity of other triggers that are referenced or executed based on activation of the trigger; organizational data 311 that may be updated by the trigger; warning information associated with critical organizational data 311 updated by the trigger (e.g., salary information, benefits information, etc.); warning information associated with critical processes involved with the trigger (e.g., modification to benefits, termination, etc.); and/or any other information that may be determined or estimated based on performing testing associated with any trigger that may be implemented in an organizational data management system. In some examples, the computer system may provide visual mapping to show the relationship between conditions and/or operations of a trigger, for example, in association with organizational data 311 and/or third-party applications. Such a visual mapping may be provided to assist users in understanding the relationship between a trigger and various aspects of an organizational data management system.

In an embodiment, the computer system may receive updated trigger configuration from a user based on the information associated with the testing. The computer system then can generate new instructions for the updated configuration of the trigger in the custom computer language and run associated tests for the trigger based on the new instructions. Generally, configuration and testing of a trigger may occur any number of times.

In an embodiment, the computer system may prevent or otherwise restrict use of certain organizational data 311 in association with a trigger. For example, a default and/or organization-specific configuration of an organizational data management system may specify one or more rules that prevent creation, deployment, enablement, and/or use of any trigger that may or could modify organizational data 311 that has been identified (e.g., classified, tagged, etc.) as sensitive or restricted data. For example, such data may include, but is not limited to, a government issued identification number, salary information, benefits information, and/or other data. In an example, an organizational data management system also may prevent the creation, deployment, enablement, and/or use of any trigger that may perform operations identified as being high-risk or requiring manual intervention. For example, such operations may include, but are not limited to, employee termination, creation of new departments, performing modifications to benefits outside of an election period, and/or another operation.

In an embodiment, the computer system determines one or more organizational approvals are to be obtained before one or more actions can be performed in association with the trigger. For example, a default and/or organization-specific configuration of an organizational data management system may indicate at least one approval requirement associated with one or more trigger configurations. In an example, an application associated with an organizational data management system determines whether one or more approvals are to be obtained in association with a trigger. For example, one or more approvals may be required to deploy, enable, and/or otherwise use a trigger with a system.

In an embodiment, an application associated with an organizational data management system determines one or more approvals to obtain for the trigger based on analyzing, for instance: information associated with configuration of the trigger; information associated with operations of the trigger; organizational data 311 to be utilized or updated based on the trigger; data structures 315 or any other available data indicating approval requirements associated with organizational data 311; data structures 315 or any other available data indicating approval requirements associated with operations performed by an organizational data management system; and/or any other available information. In an example, one or more approvals may be needed by at least one other user with appropriate permissions to create, deploy, enable, and/or otherwise utilize a trigger that updates certain types of organizational data 311 (e.g., salary information, benefits information, etc.) or performs certain types of operations involving organizational data (e.g., promoting an employee, creating a new department, creating a new company location, etc.). In some examples, approval may be required for triggers with certain behavior or diagnostic information. For example, an organization may configure an organizational data management system to require approval for any trigger that may activate two or more levels of other triggers or any trigger that may fire more than a threshold number of times within a particular time period. One or more approvals then may be sought from users with appropriate permissions and authority in view of a determination that one or more approvals are required to perform an action associated with a trigger.

At 908, a computer system (e.g., computing system 110, computing system 310, etc.) obtains one or more approvals to deploy the trigger in association with an application that manages organizational data. In an embodiment, the computer system generates and transmits one or more requests to at least one other user to obtain approval to perform an action associated with the trigger. For example, an application associated with an organizational data management system may create a task or other type of request for approving use of the trigger. Such a task or other type of request can be sent to one or more users determined to have appropriate permissions to approve use of the trigger. In addition, such a task or other type of request can include information associated with the configuration of the trigger and one or more reasons indicating why the trigger was flagged for requiring approval. In an example, an application associated with an organizational data management system receives or otherwise obtains approval to perform one or more activities associated with a trigger. For example, approval may be received to perform one or more of creating, deploying, enabling, and/or performing any other activities associated with the trigger. As an example, an approval to deploy and enable a trigger may be received from a user with appropriate permissions.

At 910, a computer system (e.g., computing system 110, computing system 310, etc.) deploys the generated instructions in the custom computer language to enable use of the trigger with the application based on the one or more approvals. In an embodiment, an application receives approval to deploy and enable the trigger in an organizational data management system. The application then can deploy instructions for the trigger in the custom computer language to an organizational data management system, for example, automatically or based on a user action. The application also can enable the trigger for use with the organizational data management system, for example, automatically or based on a user action. In an example, deployed instructions for the trigger may be stored in association with application object data 316 and utilized by the organizational data management system that provides the custom computer language.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer system that implements an organizational management platform for an organization, the computer system comprising:
one or more processors; one or more databases that collectively store organizational data associated with the organization, wherein the organizational data comprises an object graph data structure comprising a plurality of data objects that respectively correspond to a plurality of entities of the organization; and
one or more non-transitory computer-readable media that collectively store instructions that, when executed by the one or more processors, cause the computer system to perform operations, the operations comprising:
maintaining a trigger, the trigger comprising:
one or more conditions for activation of the trigger;
one or more operations for execution based on the activation of the trigger; and
a many-to-one operator that associates multiple first data objects of the plurality of data objects with a second data object of the plurality of data objects, the trigger being defined based at least in part on the many-to-one operator, wherein the many-to-one operator comprises an "AGGREGATE" operator that allows aggregated values of at least one attribute corresponding to each of the multiple first data objects to be used to define the one or more conditions with respect to the second data object;
evaluating the one or more conditions based on an occurrence of an event associated with at least one of one or more of the multiple first data objects, the second data object, or one or more entities of the plurality of entities;
determining that the one or more conditions are satisfied based on the evaluating, the determining causing the activation of the trigger; and
executing the one or more operations based on the activation of the trigger, the one or more operations being performed based at least in part on the organizational data.

2. A computer-implemented method for performing processing of computer instructions, comprising:
maintaining, by one or more processors, a trigger, the trigger comprising:
one or more conditions for activation of the trigger;
one or more operations for execution based on the activation of the trigger; and
a many-to-one operator that associates multiple first data objects of an object graph data structure with a second data object of the object graph data structure, the trigger being defined based at least in part on the many-to-one operator, wherein the many-to-one operator comprises an "AGGREGATE" operator that allows aggregated values of at least one attribute corresponding to each of the multiple first data objects to be used to define the one or more conditions with respect to the second data object;
evaluating, by the one or more processors, the one or more conditions based on an occurrence of an event associated with at least one of one or more of the multiple first data objects, the second data object, one or more first entities respectively corresponding to one or more of the multiple first data objects, or a second entity corresponding to the second data object;
determining, by the one or more processors, that the one or more conditions are satisfied based on the evaluating, the determining causing the activation of the trigger; and
executing, by the one or more processors, the one or more operations based on the activation of the trigger, the one or more operations being performed based at least in part on organizational data associated with an organization.

3. The computer-implemented method of claim 2, wherein the many-to-one operator comprises an "ANY"

operator that allows the multiple first data objects to be used to define the one or more conditions with respect to the second data object.

4. The computer-implemented method of claim 2, wherein the many-to-one operator comprises an "EXTRACT" operator that allows at least one of the multiple first data objects to be used to define the one or more conditions with respect to the second data object.

5. The computer-implemented method of claim 2, wherein the many-to-one operator comprises a "COUNT" operator that allows a total number of first data object instances of the multiple first data objects to be used to define the one or more conditions with respect to the second data object.

6. The computer-implemented method of claim 2, further comprising:
receiving, by the one or more processors, an indication of the occurrence of the event.

7. The computer-implemented method of claim 2, further comprising:
determining, by the one or more processors, whether to evaluate the one or more conditions based on analyzing information associated with the occurrence of the event.

8. The computer-implemented method of claim 2, further comprising:
detecting, by the one or more processors, the occurrence of the event, the detecting of the occurrence of the event causing the evaluating of the one or more conditions.

9. The computer-implemented method of claim 2, wherein the executing comprises performing at least one operation associated with an application based at least in part on the organizational data.

10. The computer-implemented method of claim 2, wherein the executing comprises performing at least one operation associated with a third-party application based at least in part on the organizational data, the third-party application being integrated with an application associated with at least one of the organization or the organizational data, and the third-party application utilizing at least some of the organizational data.

11. The computer-implemented method of claim 2, wherein the one or more conditions are based on the custom computer language.

12. The computer-implemented method of claim 9, wherein the application is a system of record that enables one or more users of the organization to manage the organizational data in association with one or more different third-party applications.

13. The computer-implemented method of claim 2, further comprising:
providing, by the one or more processors, one or more graphical user interfaces that enable one or more users to configure the one or more conditions based at least in part on the many-to-one operator.

14. The computer-implemented method of claim 13, wherein at least one of the graphical user interfaces comprises at least one graphical user interface that allows the one or more users to configure the one or more conditions based at least in part on a data model comprising multiple categories of the organizational data.

15. The computer-implemented method of claim 2, further comprising:
providing, by the one or more processors, one or more graphical user interfaces that enable one or more users to configure the one or more operations based at least in part on the many-to-one operator.

16. The computer-implemented method of claim 13, wherein at least one of the graphical user interfaces comprises at least one graphical user interface that allows the one or more users to configure the one or more operations based at least in part on a data model representing multiple categories of the organizational data.

17. The computer-implemented method of claim 2, further comprising:
generating, by the one or more processors, instructions in the custom computer language based on configuration information associated with the trigger.

18. The computer-implemented method of claim 2, further comprising:
deploying, by the one or more processors, instructions for the trigger in the custom computer language to enable the trigger.

* * * * *